United States Patent
Suh

(10) Patent No.: US 12,495,336 B2
(45) Date of Patent: Dec. 9, 2025

(54) METHOD AND DEVICE FOR PERFORMING COMMUNICATION IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 17/764,148

(22) PCT Filed: Sep. 25, 2020

(86) PCT No.: PCT/KR2020/013034
§ 371 (c)(1),
(2) Date: Mar. 25, 2022

(87) PCT Pub. No.: WO2021/060904
PCT Pub. Date: Apr. 1, 2021

(65) Prior Publication Data
US 2022/0338071 A1    Oct. 20, 2022

(30) Foreign Application Priority Data

Sep. 25, 2019  (KR) .................. 10-2019-0118373
Sep. 27, 2019  (KR) .................. 10-2019-0120129

(51) Int. Cl.
| | |
|---|---|
| H04B 7/212 | (2006.01) |
| H04W 8/24 | (2009.01) |
| H04W 36/00 | (2009.01) |

(52) U.S. Cl.
CPC ......... *H04W 36/0038* (2013.01); *H04W 8/24* (2013.01); *H04W 36/0022* (2013.01)

(58) Field of Classification Search
CPC ......... H04W 36/0038; H04W 36/0022; H04W 8/24; H04W 60/00
(Continued)

(56) References Cited

U.S. PATENT DOCUMENTS

| | | |
|---|---|---|
| 9,906,983 B2 | 2/2018 | Sirotkin et al. |
| 2011/0142239 A1 | 6/2011 | Suh et al. |

(Continued)

FOREIGN PATENT DOCUMENTS

| | | |
|---|---|---|
| KR | 10-1579757 B1 | 12/2015 |
| WO | WO-2020025047 A1 * | 2/2020 |

OTHER PUBLICATIONS

Nokia (S2-1907057, Jun. 24-28, 2019, Support of RACS in PLMNs with distributed and Support of RACS in PLMNs with distributed and-non coordinated filtering of UE radio capabilities) (Year: 2019).*

(Continued)

*Primary Examiner* — Maharishi V Khirodhar

(57) ABSTRACT

A method of a user equipment (UE) in a wireless communication system includes: transmitting, to a core entity, a tracking area update (TAU) request message including UE radio capability information associated with a UE radio capability identity (ID); receiving, from the core entity, a security mode command message for requesting UE radio capability ID information, based on the UE radio capability information; and transmitting, to the core entity, a security mode complete message including the UE radio capability ID information.

7 Claims, 20 Drawing Sheets

(58) Field of Classification Search
USPC .......................................................... 370/331
See application file for complete search history.

(56) References Cited

U.S. PATENT DOCUMENTS

2015/0118997 A1    4/2015  Wu
2019/0239064 A1    8/2019  Stojanovski et al.

OTHER PUBLICATIONS

3GPP ( TS 24.301 V16.2.0, Sep. 24, 2019, Non-Access-Stratum (NAS) protocol for Evolved Packet System (EPS), Stage 3, Release 16)). (Year: 2019).*
Vivo (S2-1907953, "Correction on support of RACS", Jun. 24-28, 2019), see p. 18-21. (Year: 2019).*
NTT (R2-1815429, Solution for UE capability signaling optimization using UE capability ID, Oct. 8-12, 2018). (Year: 2018).*
Apple (R2-1815061, Optimization on UE radio capability signaling, Oct. 8-12, 2018), (Year: 2018).*
Over Nokia (S2-1907057, Jun. 24-28, 2019, Support of RACS in PLMNs with distributed and-non coordinated filtering of UE radio capabilities) (Year: 2019).*
Qualcomm Incorporated( R3-191374,On Provisioning of UE Capability ID, Xi'an, China, Greece, Apr. 8-12, 2019, (Year: 2019), (Year: 2019).*
3GPP TSG CT WG4, "New WID on CT aspects of optimisations on UE radio capability signalling", 3GPP TSG-CT Meeting #84, Jun. 3-4, 2019, CP-191230, 4 pages.
Ericsson, "RAN Aspects on changes of the UE radio capabilities", 3GPP TSG-RAN WG2 #107, Aug. 26-30, 2019, Tdoc R2-1909518, 6 pages.
Nokia et al., "UE capability ID list in handover", 3GPP TSG-RAN WG2 Meeting #107, Aug. 26-30, 2019, R2-1909975, 3 pages.
Supplementary European Search Report dated Sep. 7, 2022 in connection with European Patent Application No. 20 86 9901, 13 pages.
International Search Report of the International Searching Authority dated Dec. 21, 2020, in connection with International Application No. PCT/KR2020/013034, 4 pages.
3GPP TS 23.401 V16.4.0 (Sep. 2019), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 16), 424 pages.
3GPP TS 24.301 V16.2.0 (Sep. 2019), Technical Specification, 3rd Generation Partnership Project; Technical Specification Group Core Network and Terminals; Non-Access-Stratum (NAS) protocol for Evolved Packet System (EPS); Stage 3 (Release 16), 558 pages.
Written Opinion of the International Searching Authority dated Dec. 21, 2020, in connection with International Application No. PCT/KR2020/013034, 8 pages.
Notice of Non-final Rejection dated Sep. 4, 2020, in connection with Korean Application No. 10-2019-0120129, 7 pages.
Notice of Allowance dated Jan. 15, 2021, in connection with Korean Application No. 10-2019-0120129, 4 pages.
Qualcomm Incorporated, et al., "Adds UE Radio Capability ID in signalling procedures," S2-1906385 (was S2-1903203), 3GPP TSG-SA WG2 Meeting #133, Reno, NV, May 13-17, 2019, 65 pages.
Communication pursuant to Article 94(3) EPC dated Feb. 29, 2024, in connection with European Patent Application No. 20869901.7, 10 pages.
Qualcomm Incorporated et al., "Adding general description of RACS," 3GPP TSG-CT WG1 Meeting #119, C1-194402, Wroclaw (Poland), Aug. 2019, 11 pages.
Qualcomm Incorporated et al., "Signalling of UE support for RACS and of UE radio capability ID," 3GPP TSG-CT WG1 Meeting #119, C1-194404, Wroclaw (Poland), Aug. 2019, 27 pages.
Communication pursuant to Article 94(3) EPC dated Oct. 9, 2024, in connection with European Application No. 20869901.7, 9 pages.
Communication pursuant to Article 94(3) EPC dated May 20, 2025, in connection with European Application No. 20869901.7, 9 pages.

* cited by examiner

FIG. 17

| 8 | 7 | 6 | 5 | 4 | 3 | 2 | 1 | |
|---|---|---|---|---|---|---|---|---|
| UE radio capability information IEI ||||||||  octet 1 |
| UE radio capability information length |||||||| octet 2 |
| UE radio capability information value |||||||| octets 3-n |

FIG. 18

| 8 | 7 | 6 | 5 | 4 | 3 | 2 | 1 | |
|---|---|---|---|---|---|---|---|---|
| PLMN assigned UE Radio capability information IEI ||||||||  octet 1 |
| PLMN assigned UE Radio capability information length |||||||| octet 2 |
| PLMN assigned UE Radio capability information value |||||||| octets 3-n |

FIG. 20

| 8 | 7 | 6 | 5 | 4 | 3 | 2 | 1 | |
|---|---|---|---|---|---|---|---|---|
| \multicolumn{8}{|c|}{UE Radio capability information IEI} | octet 1 |
| \multicolumn{8}{|c|}{UE Radio capability information length} | octet 2 |
| \multicolumn{8}{|c|}{UE Radio capability information value} | octets 3-n |

METHOD AND DEVICE FOR PERFORMING COMMUNICATION IN WIRELESS COMMUNICATION SYSTEM

CROSS-REFERENCE TO RELATED APPLICATIONS

This application is a 371 National Stage of International Application No. PCT/KR2020/013034, filed Sep. 25, 2020, which claims priority to Korean Patent Application No. 10-2019-0118373, filed Sep. 25, 2019, and Korean Patent Application No. 10-2019-0120129, filed Sep. 27, 2019, the disclosures of which are herein incorporated by reference in their entirety.

BACKGROUND

1. Field

The disclosure relates to a technology regarding a method of interpreting radio access information in a communication environment in which an access and mobility management function (AMF) and a session management function (SMF) of 5th generation (5G) and a mobility management entity (MME) of 4th generation (4G), which operate in different manners, coexist.

In particular, when a user equipment (UE) moves from a node that does not know radio access-related information to a node capable of interpreting the radio access-related information, the corresponding information may be transmitted from the UE or a network node that interprets and compares information transmitted from the UE may expect the corresponding information to be transmitted from an MME to an AMF or from an AMF to an MME.

Accordingly, the disclosure relates to a method of addressing an issue occurred in each of a UE and a network node when, while processing radio access-related information by using a non access stratum (NAS) message, pieces of radio access-related information of the UE, an MME that is a network node of 4G long-term evolution (LTE), and an AMF that is a network node in charge of mobility control of 5G do not match each other or an issue in which the radio access-related information is not transmitted occurs, a method of solving issues that may occur when information is unable to be properly processed, by transmitting a signal via an NAS message, and an apparatus for performing such functions.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why 5G communication systems or pre-5G communication systems are called beyond 4G network communication systems or post long-term evolution (LTE) systems. In order to achieve a high data transmission rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies such as beam-forming, massive multiple-input multiple-output (MIMO), full dimensional MIMO (FD-MIMO), array antennas, analog beam-forming, and large-scale antennas have been discussed. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (COMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G technology and IoT technology.

As described above, various services are able to be provided due to the development of mobile communication systems, and thus, there is need for methods of effectively providing such services.

SUMMARY

In a next-generation wireless communication system (5th generation (5G) or new radio (NR)), an access and mobility management function (AMF) that is a management entity managing mobility of a user equipment (UE) and a session management function (SMF) that is an entity managing a session may be separated. Accordingly, unlike an operation method of existing 4th generation long-term evolution (LTE) communication, in which a mobility management entity (MME) manages mobility and a session together, entities managing mobility and managing a session are separated in the next-generation wireless communication system, and thus a communication method and communication management method between the UE and a network entity may be changed.

In the next-generation wireless communication system, regarding a non-3GPP access, mobility management may be performed via the AMF through an N3 interworking function (N3IWF) and session management may be performed via the SMF. Also, security-related information that is an important factor in the mobility management may also be handled via the AMF.

Meanwhile, in the 4G, the MME performs mobility management and session management, and thus there is a need to provide a method of processing radio access-related information when the UE moves from 4G to 5G or from 5G to 4G, in non stand alone architecture in which entities for 4G and 5G communications coexist.

In particular, as Case 1, in a situation in which the UE moves from 4G to 5G, when the UE and the AMF of 5G that is a handover target are able to process the radio access-related information and the MME of 4G is unable to process the radio access-related information, there is a need for a method of processing the radio access-related information. Also, as Case 2, in the situation in which the UE moves from 4G to 5G, when the UE, the MME of 4G, and the AMF of 5G are able to process the radio access-related information, there is a need for a method regarding how to deliver the corresponding information with respect to handover or mobility movement.

Also, in a situation in which the UE moves from 5G to 4G, when the UE, the AMF of 5G, and the MME of 4G are able to process the radio access-related information, there is a need for a method regarding how to deliver the corresponding information with respect to handover or mobility movement. According to another embodiment, in the situation in which the UE moves from 5G to 4G, when the UE and the AMF of 5G are able to process the radio access-related information and the MME of 4G is unable to process the radio access-related information, there is a need for a method regarding how to process the corresponding information with respect to handover or mobility movement.

Accordingly, the disclosure proposes a method by which a UE and a network node each process radio access-related information when, while processing the radio access-related information by using a non access stratum (NAS) message, pieces of radio access-related information of the UE, an MME that is a network node of 4G LTE, and an AMF that is a network node in charge of mobility control of 5G do not match each other or are not transmitted, and a method of solving issues that may occur when information is unable to be properly processed, by transmitting a signal via an NAS message, and provides an apparatus for performing such functions.

Through the disclosure, in an environment in which 4th generation (4G) and 5th generation (5G) coexist and in which a node supporting radio access information and a node not supporting radio access information coexist, a user equipment (UE) and a network node can efficiently perform communication by:

1) notifying that the corresponding information is not supported when moving to the node not supporting radio access-related information,
2) providing a method of supporting the corresponding information and performing communication by using the radio access information when moving to the node supporting the radio access-related information, and
3) providing a method of synchronizing the corresponding information in an environment in which the UE and the network node of the corresponding information are not synchronized for the radio access-related information.

BRIEF DESCRIPTION OF THE DRAWINGS

FIG. 17 illustrates an example of UE radio capability information according to embodiments of the disclosure;

FIG. 18 illustrates an example of a radio information IE according to embodiments of the disclosure;

FIG. 20 illustrates an example of UE radio capability information according to embodiments of the disclosure.

DETAILED DESCRIPTION

Figure 1:
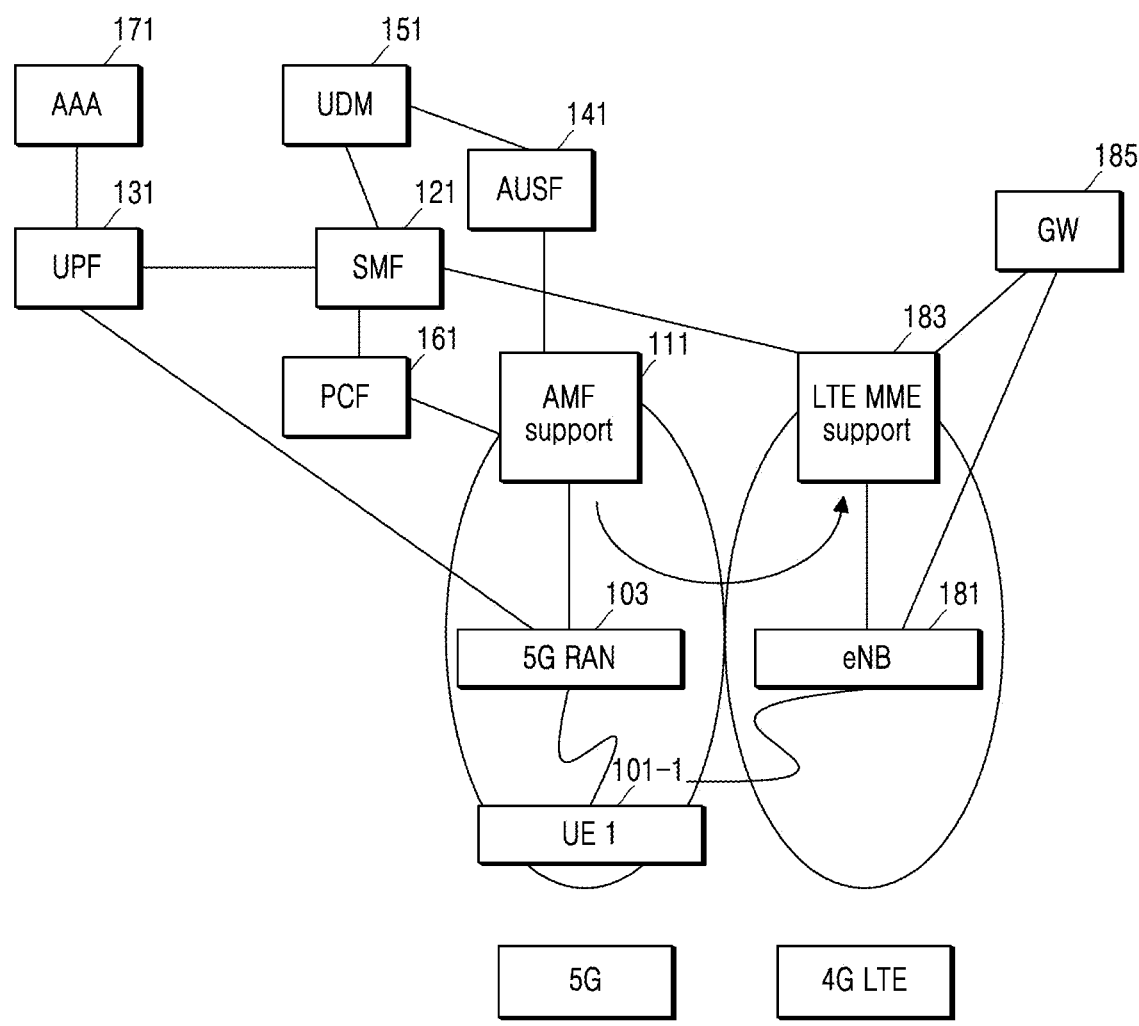
FIG. 1 is a diagram for describing an environment in which a 5th generation (5G) network and a 4th generation (4G) network coexist, according to an embodiment of the disclosure.

According to an embodiment of the disclosure, a method of a core entity in a wireless communication system, includes: receiving, from a user equipment (UE), a tracking area update (TAU) request message including UE radio capability information associated with a UE radio capability identity (ID); transmitting, to the UE, a security mode command message for requesting UE radio capability ID information, based on the UE radio capability information; and receiving, from the UE, a security mode complete message including the UE radio capability ID information.

According to an embodiment of the disclosure, a method of a user equipment (UE) in a wireless communication system, includes: transmitting, to a core entity, a tracking area update (TAU) request message including UE radio capability information associated with a UE radio capability identity (ID); receiving, from the core entity, a security mode command message for requesting UE radio capability ID information, based on the UE radio capability information; and transmitting, to the core entity, a security mode complete message including the UE radio capability ID information.

According to an embodiment of the disclosure, a user equipment (UE) in a wireless communication system includes: a transceiver; and at least one processor configured to: transmit, to a core entity via the transceiver, a tracking area update (TAU) request message including UE radio capability information associated with a UE radio capability identity (ID); receive, from the core entity via the transceiver, a security mode command message for requesting UE radio capability ID information, based on the UE radio capability information; and transmit, to the core entity via the transceiver, a security mode complete message including the UE radio capability ID information.

According to an embodiment of the disclosure, a core entity in a wireless communication system includes: a transceiver; and at least one processor configured to: receive, from a user equipment (UE) through the transceiver, a tracking area update (TAU) request message including UE radio capability information associated with a UE radio capability identity (ID); transmit, to the UE through the transceiver, a security mode command message for requesting UE radio capability ID information, based on the UE radio capability information; and receive, from the UE through the transceiver, a security mode complete message including the UE radio capability ID information.

Hereinafter, exemplary embodiments of the disclosure will be described in detail with reference to the accompanying drawings. Here, it should be noted that like reference numerals denote like elements in the accompanying drawings. Also, detailed descriptions about known functions and configurations that may blur the gist of the disclosure will be omitted.

While describing embodiments in the present specification, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of one or more embodiments of the disclosure and methods of accomplishing the same may be understood more readily by reference to the following detailed description of the embodiments of the disclosure and the accompanying drawings. In this regard, embodiments of the disclosure may have different forms and should not be construed as being limited to the descriptions set forth herein. Rather, these embodiments are provided so that the disclosure will be thorough and complete and will fully convey the concept of the present embodiments of the disclosure to one of ordinary skill in the art. Throughout the specification, like reference numerals denote like elements.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of descriptions, the disclosure uses terms and names defined in the standards for a 5th generation (5G) or long-term evolution (LTE) system. However, the disclosure is not limited by such terms and names, and may be equally applied to systems conforming to other standards.

In other words, while describing the embodiments of the disclosure in detail, a main target is a communication standard defined by 3GPP, but an important gist of the disclosure may be applied, with a slight modification, to other communication systems having a similar technical background, within a range not greatly departing from the scope of the disclosure, and the applicability would be determined by one of ordinary skill in the art.

FIG. 1 is a diagram for describing an environment in which a 5th generation (5G) network and a 4th generation (4G) network coexist, according to an embodiment of the disclosure.

A 5G network system according to an embodiment of the disclosure may include a user plane function (UPF), a session management function (SMF), an access and mobility management function (AMF), a 5G radio access network (RAN), a user data management (UDM), and a policy control function (PFC), but this is only an example and entities included in the 5G network system are not limited thereto. According to another embodiment, the 5G network system may also include an authentication server function (AUSF) and an authentication, authorization, and accounting (AAA) for authentication of the entities.

Meanwhile, an N3 interworking function (N3IWF) exists for a case where a user equipment (UE) communicates through a non 3GPP access, and when the non 3GPP access is used, session management may be processed through the UE, the non 3GPP access, the N3IWF, and the SMF and may be controlled by the SMF, and mobility management may be processed through the UE, the non 3GPP access, the N3IWF, and the AMF and may be controlled by the AMF.

In an embodiment of the disclosure, it is assumed that 5G and 4G systems coexist. In 4G, a mobility management entity (MME) in charge of mobility management and session management may be in charge of controlling communication of the UE. In 5G, mobility management and session management entities may be separated into the AMF and the SMF. Meanwhile, a stand alone deployment structure performing communication only with 5G communication entities for 5G communication, and a non stand alone deployment structure using 4G and 5G entities for the 5G communication may also be considered.

As shown in FIG. 1, a deployment may be possible, in which, when the UE communicates with a network, the UE uses an evolved node B (eNB) for control and uses a 5G entity as a core network. In this case, in a non access stratum (NAS) that is a layer 3, the UE and the AMF are in charge of the mobility management and the UE and the SMF are in charge of the session management, whereas an access stratum (AS) that is a layer 2 is transmitted through the UE and the eNB, and thus there is a need for a method of generating and managing security context accordingly. In this regard, the disclosure describes security context generation, management, and protocol exchange applicable to such a deployment situation.

In the disclosure, a UE may perform general EUTRAN communication via the eNB and the MME, and perform data communication via a serving gateway and a public data network (PDN) gateway, in relation to 4G. Meanwhile, a HSS may be present and thus subscription information regarding the UE, UE-related security key information, and the like may be transmitted.

A communication network to which the disclosure is applied is a network in which 5G and 4G coexist, but the disclosure may be applied to another system when the same concept is applied to the other system, within the scope apprehended by one of ordinary skill in the art.

FIG. 1 relates to a scenario that may occur when the UE moves from 5G to 4G or is moved due to handover or mobility. In other words, the UE moves from 5G to 4G, the AMF of 5G supports radio access-related information, and the LTE MME also supports the radio access-related information.

In other words, the UE moves from a network having the 5G AMF supporting the radio access-related information to the 4G LTE MME supporting the radio access-related information, and it is unable for the UE, MME, and the AMF to verify whether the other has valid radio access-related information.

Figure 2:
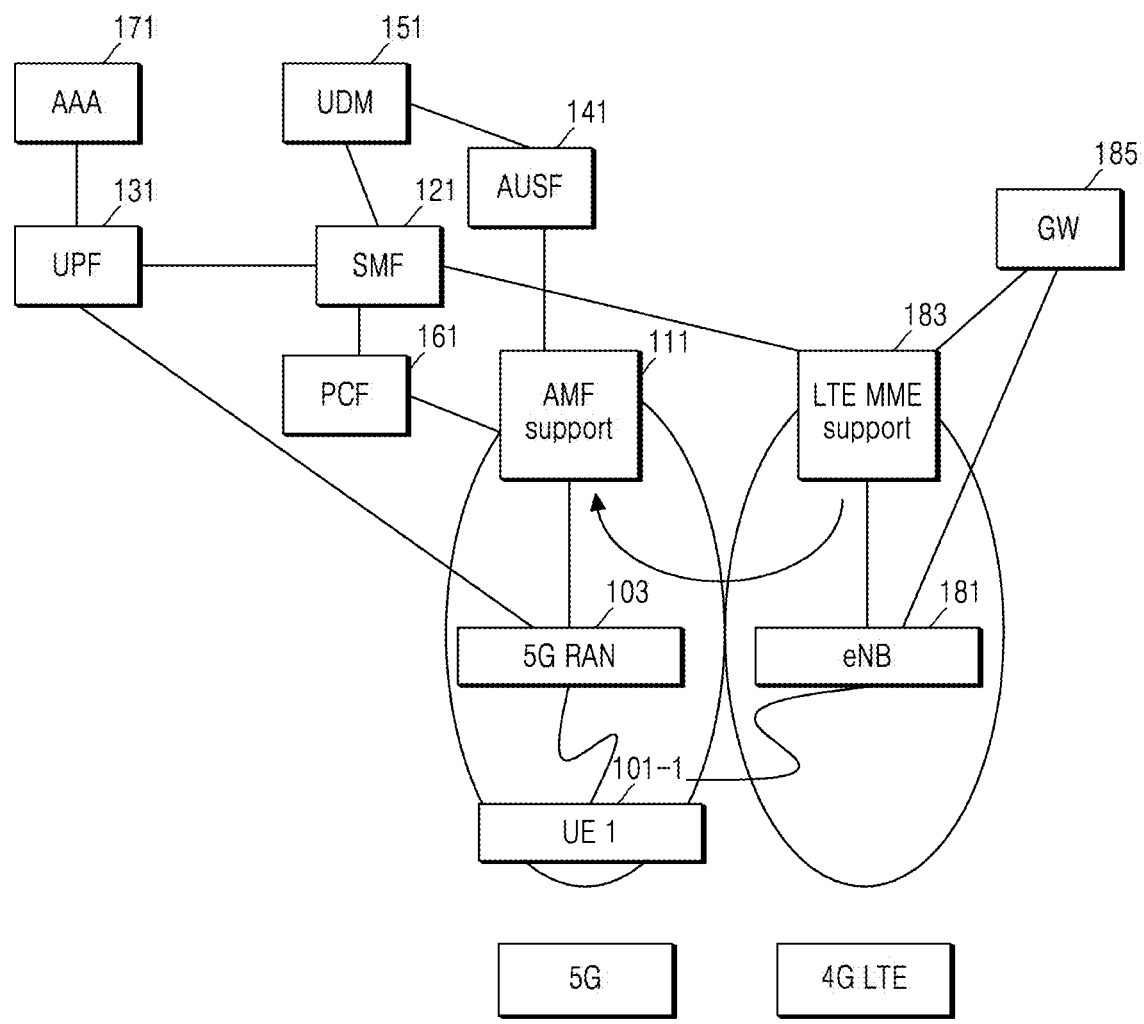
FIG. 2 is a diagram for describing an environment in which a 5G network and a 4G network coexist, according to another embodiment of the disclosure.

FIG. 2 relates to a scenario that may occur when a UE moves from 4G to 5G or is moved due to handover or mobility. In other words, the UE moves from 4G to 5G, and an AMF of 5G may or may not support radio access-related information, and an MME of 4G may or may not support the radio access-related information.

That is, the UE moves from a network having the 4G MME supporting the radio access-related information to a network having the 5G AMF supporting the radio access-related information, and it is unable for the UE, MME, and the AMF to verify whether the other has valid radio access-related information.

Figure 3:
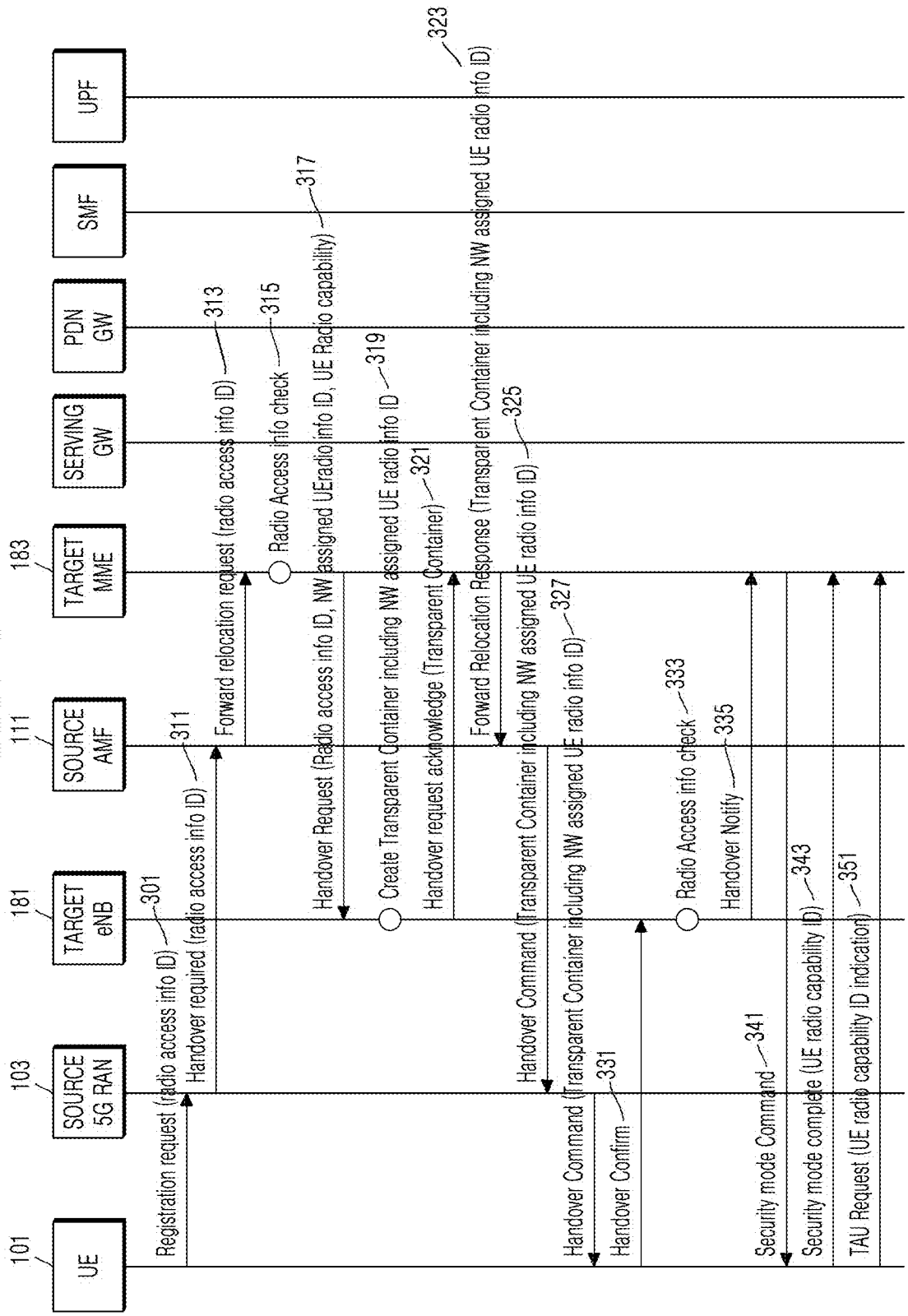
FIG. 3 is a diagram for describing a method of transmitting user equipment (UE) radio information when a UE is handed over from a 5G system to a 4G system, in an environment in which the 5G system and a long-term evolution (LTE) system coexist, according to an embodiment of the disclosure.

FIG. 3 is a diagram for describing a method of transmitting UE radio information when a UE is handed over from a 5G system to a 4G system, in an environment in which the 5G system and an LTE system coexist, according to an embodiment of the disclosure.

In operation 301, a UE 101 may transmit a registration request to an AMF.

Here, when the UE supports transmitting of UE radio information (for example, UE radio capability information identity (ID)), the UE may transmit a registration request non access stratum (NAS) message including the UE radio information ID (for example, a UE radio capability ID).

Figure 13:
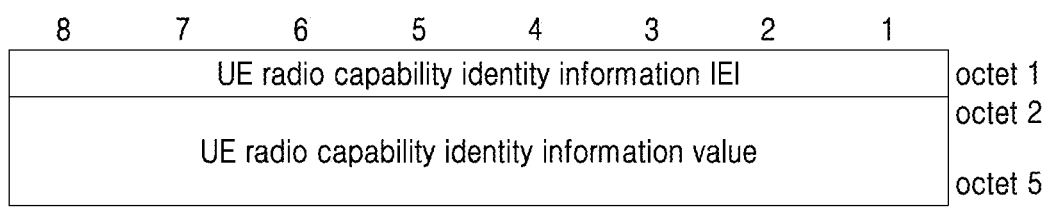
FIG. 13 illustrates an example UE radio capability ID information information element (IE) according to embodiments of the disclosure.

For example, a UE radio capability ID information information element (IE) may be configured as shown in FIG. 13 while including a part of a UE radio capability ID information value as an IE. FIG. 13 illustrates an example UE radio capability ID information IE according to embodiments of the disclosure.

The UE radio capability ID information may be a manufacturer ID, such as an ID assigned by each manufacturer to a product, according to an embodiment. According to another embodiment, the UE radio capability ID information may be network assigned or public land mobile network (PLMN) assigned UE radio information related to a PLMN assigned already as the UE accessed a network, or a PLMN assigned UE radio capability information.

In operation 311, a source 5G RAN 103 may transmit a handover required message to a (the?) source AMF 111.

Here, the UE radio information (for example, the UE radio capability information ID) may be transmitted from the source 5G RAN 103 to the source AMF 111.

In operation 313, the source AMF 111 may transmit a forward relocation request message to a target MME 183. Here, the source AMF 111 may transmit the UE radio information (for example, the UE radio capability information ID) received from the UE 101 by including the same to the forward relocation request message.

In operation 315, the target MME 183 may verify whether there is UE radio capability information in which the network knows about the UE 101, based on the UE radio capability information transmitted from the UE 101. In other words, when the network already has information about the UE 101, for example, it may be verified whether the network has UE radio capability information, UE manufacturer ID, or UE radio information transmitted by the UE 101. Also, when the network has the information about the UE 101, it may be verified whether information the network has regarding the UE 101 matches information transmitted by the UE.

Also, in operation 315, the source AMF 111 may generate network assigned PLMN associated UE radio information (for example, network assigned UE radio information, PLMN assigned UE radio information, or PLMN assigned UE radio capability ID information IE) and assign the same to the UE. Such an operation may be performed when information the target MME 183 has and information the UE 101 has do not match each other, or the target MME 183 is to assign the PLMN assigned UE radio information to the UE 101.

Figure 14:
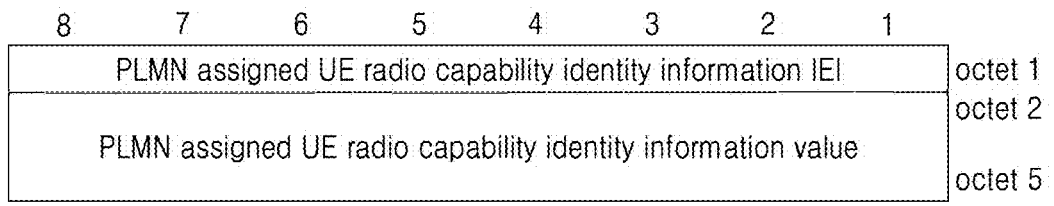
FIG. 14 illustrates an example public land mobile network (PLMN) assigned UE radio capability ID information IE according to embodiments of the disclosure.

For example, the PLMN assigned UE radio capability ID information IE may be configured as shown in FIG. 14 while including a part of a PLMN assigned UE radio capability ID information value as an IE. FIG. 14 illustrates an example PLMN assigned UE radio capability ID information IE according to embodiments of the disclosure.

In operation 317, the target MME 183 may transmit a handover request message to a target eNB 181. The handover request message may include a parameter (IE) including the PLMN assigned UE radio capability ID information described above, and parameters related to the UE radio capability information ID and UE radio capability.

In operation 319, the target eNB 181 may generate a transparent container. An IE, i.e., a parameter or information, included in the transparent container is information used by a radio resource control (RRC) message or included in the RRC message thereafter, and may include the PLMN assigned UE radio capability ID information.

In operation 321, the target eNB 181 transmits a handover request acknowledgement message to the target MME 183, and at this time, the transparent container generated in operation 319 may be transmitted while including the PLMN assigned UE radio capability ID information.

Then, in operation 323, the target MME 183 may transmit a forward relocation response message to the source AMF 111.

In operation 325, the source AMF 111 transmits a handover command to the source 5G RAN 103, and at this time, the transparent container generated in operation 319 may be transmitted.

Then, in operation 327, the source 5G RAN 103 may transmit, to the UE 101, the handover command including the PLMN assigned UE radio capability ID information.

Next, in operation 331, the UE 101 may transmit handover confirmation to the target eNB 181.

In operation 333, the target eNB 181 may identify radio information capability information. Accordingly, the target eNB 181 may verify whether information the 5G RAN has and information the UE has match each other.

In operation 335, the target eNB 181 may transmit a handover notify message to the target MME 183.

In operation 341, the target MME 183 may transmit a security mode command message to the UE 101.

In operation 343, the UE 101 may transmit, to the target MME 183 a security mode complete message including a UE radio capability information IE or a UE radio information-related IE.

Then, in operation 351, the UE 101 may transmit, to the target MME 183, a tracking area update (TAU) request message including a UE radio capability IE. Here, the included UE radio capability information may be the PLMN assigned UE radio capability ID information included in the UE 101. According to another embodiment, UE radio access capability information included in the UE may be a UE radio capability ID.

Figure 4:
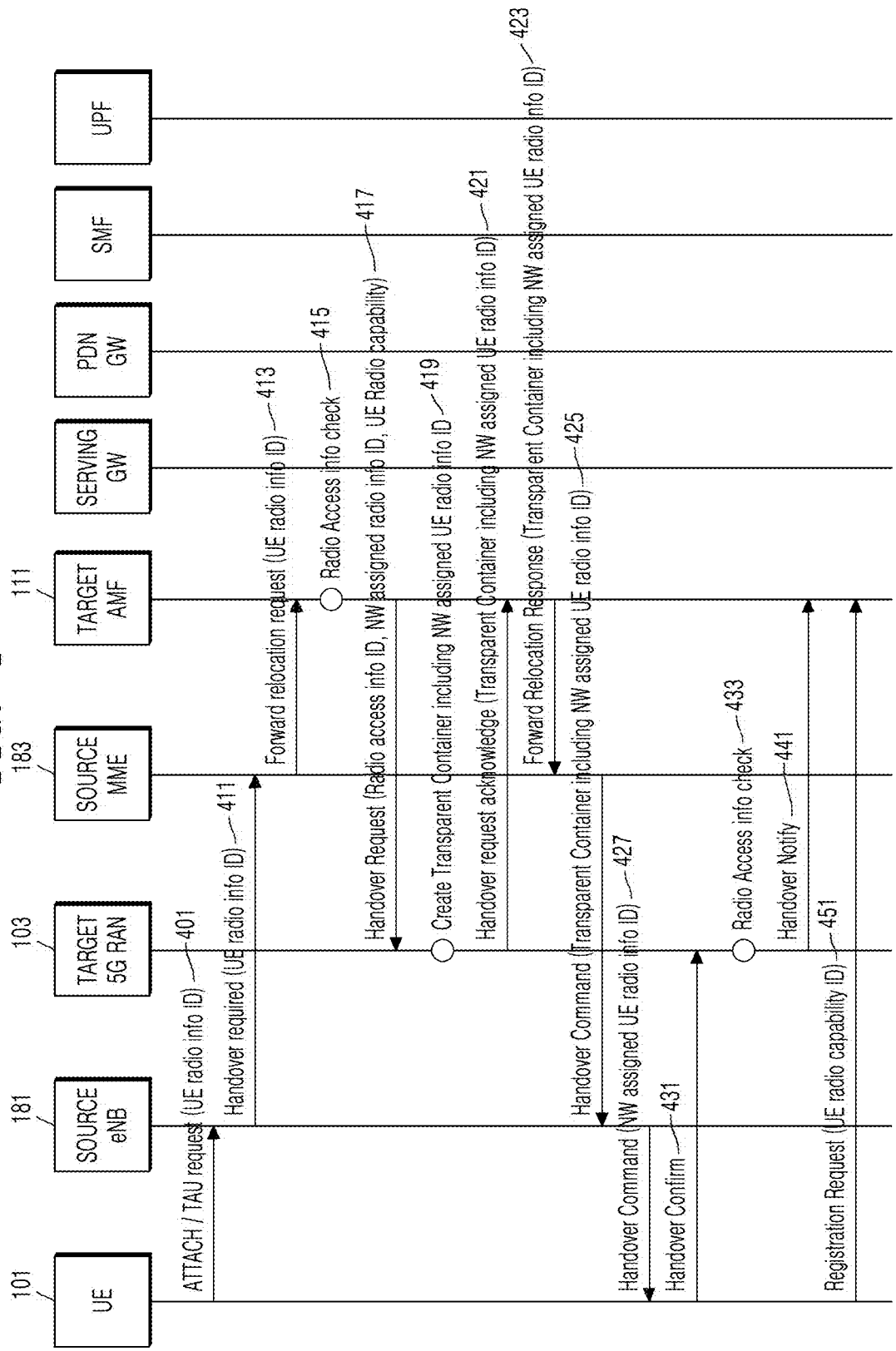
FIG. 4 is a diagram for describing a method of transmitting UE radio information when a UE is handed over from a 4G system to a 5G system, in an environment in which the 5G system and the 4G system coexist, according to an embodiment.

FIG. 4 is a diagram for describing a method of transmitting UE radio information when a UE is handed over from a 4G system to a 5G system, in an environment in which the 5G system and the 4G system coexist, according to an embodiment.

In operation 401, the UE 101 is accessed to the source eNB 181 as an attach request is transmitted. As another example, the UE 101 may be already accessed to 4G in a connected state, and transmit a TAU request. Here, when the UE 101 supports transmitting of UE radio information (for example, a UE radio capability information ID), the UE 101 may transmit an attach request NAS message or TAU NAS message including the UE radio information ID (for example, a UE radio capability ID).

Figure 15:
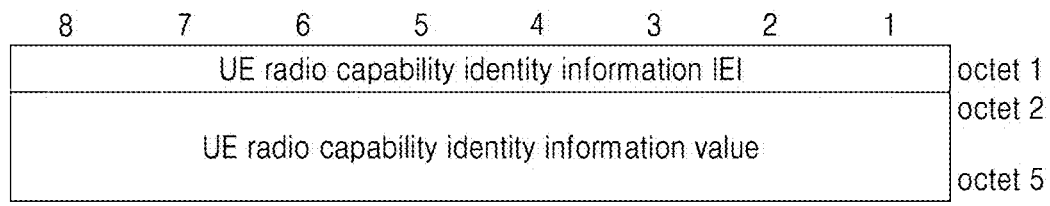
FIG. 15 illustrates an example UE radio capability ID information IE according to embodiments of the disclosure.

For example, a UE radio capability ID information IE may be configured as shown in FIG. 15 while including a part of a UE radio capability ID information value as an IE. FIG. 15 illustrates an example UE radio capability ID information IE according to embodiments of the disclosure.

The UE radio capability ID information may be a manufacturer ID, such as an ID assigned by each manufacturer to a product, according to an embodiment. According to another embodiment, the UE radio capability ID information may be network assigned or PLMN assigned UE radio information related to a PLMN already assigned as the UE accessed a network, or PLMN assigned UE radio capability information.

In operation 411, the source eNB 181 may transmit a handover required message to the source MME 183.

Here, the UE radio information (for example, the UE radio capability information ID) may be transmitted from the source eNB 181 to the source MME 183.

In operation 413, the source MME 183 may transmit a forward relocation request message to the target AMF 111. Here, the source MME 183 may transmit the forward relocation request message including the UE radio information (for example, the UE radio capability information ID) received from the UE 101.

In operation 415, the target AMF 111 may verify whether the UE radio capability information transmitted from the UE 101 corresponds to the UE radio capability information in which the network knows about the UE. In other words, when the network already has information about the UE, for example, the target AMF 111 may verify whether the network has UE radio capability information, UE manufacturer ID, or UE radio information transmitted by the UE. Also, when it is verified that the network has the information about the UE 101, the target AMF 111 may verify whether the information the network has regarding the UE 101 matches the information transmitted by the UE.

Also, in operation 415, the target AMF 111 may generate network assigned PLMN associated UE radio information (for example, network assigned UE radio information, PLMN assigned UE radio information, or PLMN assigned UE radio capability ID information IE) and assign the same to the UE. Such a case may occur when information the AMF has and information the UE has do not match each other or when the AMF is to assign the PLMN assigned UE radio information to the UE.

Figure 16:
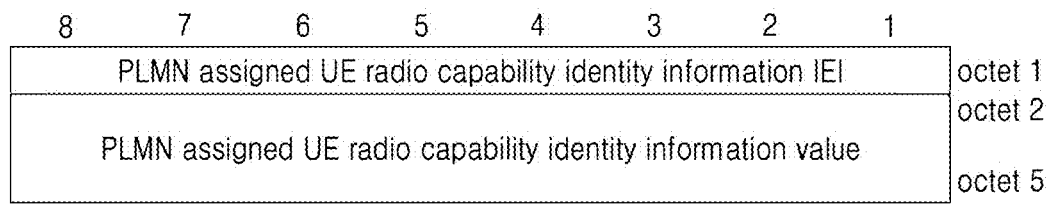
FIG. 16 illustrates an example PLMN assigned UE radio capability ID information IE according to embodiments of the disclosure.

For example, the PLMN assigned UE radio capability ID information IE may be configured as shown in FIG. 16 while including a part of a PLMN assigned UE radio capability ID information value as an IE. FIG. 16 illustrates an example PLMN assigned UE radio capability ID information IE according to embodiments of the disclosure.

In operation 417, a handover request message may be transmitted from the target AMF 111 to the target 5G RAN 103. The handover request message may include an IE, i.e., a parameter, including the PLMN assigned UE radio capability ID information described above, and parameters related to the UE radio capability information ID and UE radio capability.

In operation 419, the target 5G RAN 103 may generate a transparent container. The transparent container may include the PLMN assigned UE radio capability ID information as information used by an RRC message thereafter.

In operation 421, the target 5G RAN 103 may transmit a handover request acknowledgement message to the target AMF 111, and at this time, the transparent container including the PLMN assigned UE radio capability ID information generated in operation 419 may be transmitted.

In operation 423, the target AMF 111 may transmit a forward relocation response message to the source MME 183.

In operation 425, the source MME 183 transmits a handover command to the source eNB 181, and at this time, the transparent container generated in operation 419 may be transmitted.

Then, in operation 427, the handover command including the PLMN assigned UE radio capability ID information may be transmitted from the source eNB 181 to the UE 101.

Next, in operation 431, the UE 101 may transmit handover confirmation to the target 5G RAN 103.

In operation 433, the target 5G RAN 103 may identify radio information capability information. This is to check whether information the target 5G RAN 103 has matches information the UE has.

In operation 435, the target 5G RAN 103 may transmit a handover notify message to the target AMF 111.

Then, in operation 451, the UE 101 may transmit, to the target AMF 111, a registration request including a UE radio capability IE. Here, the included UE radio capability information may be the PLMN assigned UE radio capability ID information included in the UE. According to another embodiment, the UE radio capability information may be UE radio access capability information, i.e., UE radio capability ID, included in the UE 101.

Figure 5:
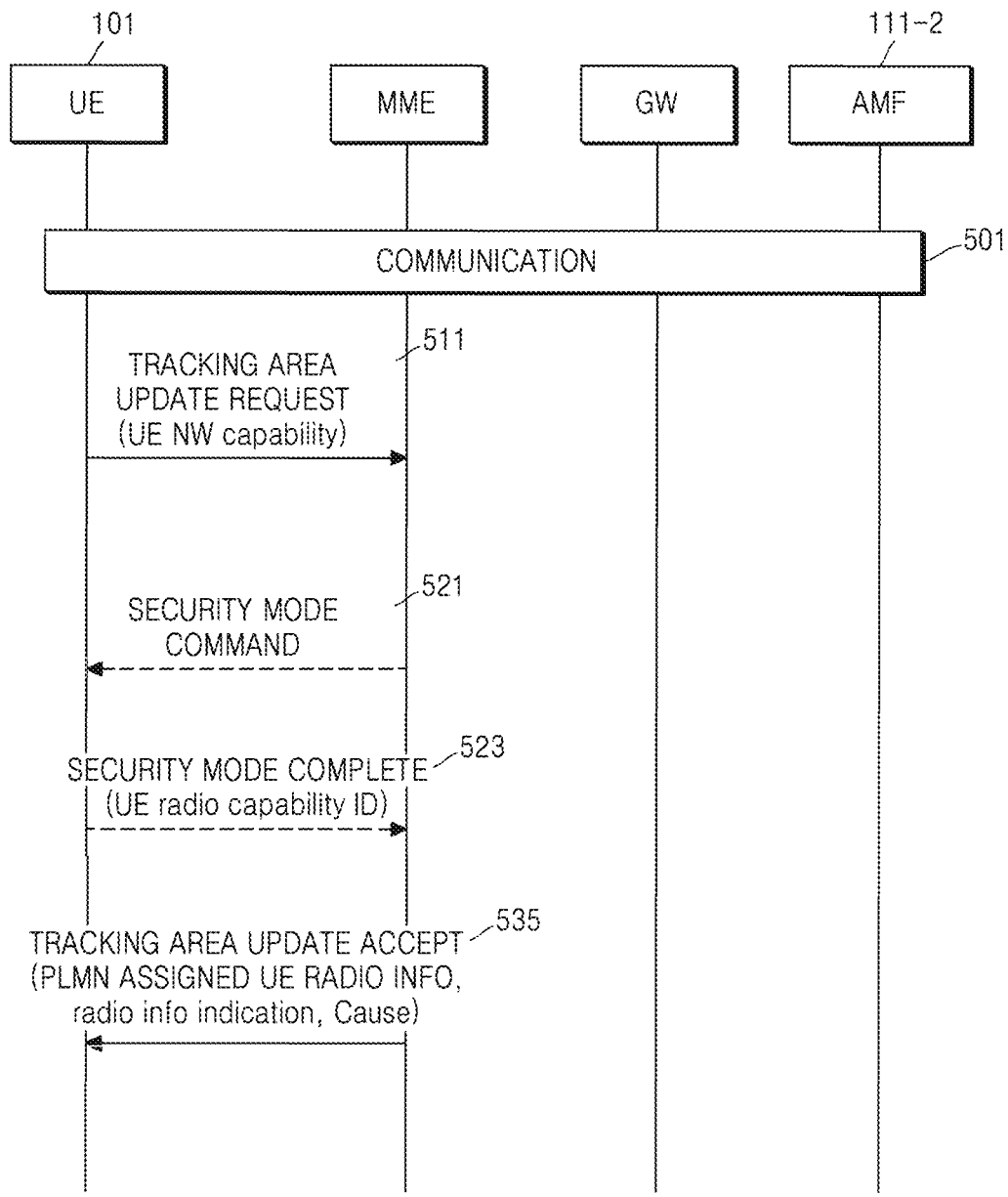
FIG. 5 is a diagram for describing a non access stratum (NAS) message information processing and communicating method in a 5G network environment, according to an embodiment of the disclosure.

FIG. 5 is a diagram for describing an NAS message information processing and communicating method in a 5G network environment, according to an embodiment of the disclosure.

In operation 501, the UE 101 is communicating with an AMF 111-2 and an SMF in a 5G network.

In operation 511, the UE 101 may perform a TAU request by moving from the 5G network to a 4G network. Here, the UE 101 transmits TAU to an MME and notifies a network whether UE network capability supports UE radio information.

In Table 1 below, the UE 101 may transmit radio access-related information by using a UE network capability IE included in a TAU request message.

TABLE 1

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update request message identity | Message type 9.8 | M | V | 1 |
| | EPS update type | EPS update type 9.9.3.14 | M | V | ½ |
| | NAS key set identifier | NAS key set identifier 9.9.3.21 | M | V | ½ |
| | Old GUTI | EPS mobile identity 9.9.3.12 | M | LV | 12 |
| B- | Non-current native NAS | NAS key set identifier | O | TV | 1 |

TABLE 1-continued

| IEI | Information Element | Type/Reference | Presence | Format | Length |
|---|---|---|---|---|---|
| | key set identifier | 9.9.3.21 | | | |
| 8- | GPRS ciphering key sequence number | Ciphering key Sequence number 9.9.3.4a | O | TV | 1 |
| 19 | Old P-TMSI signature | P-TMSI signature 9.9.3.26 | O | TV | 4 |
| 50 | Aditional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |

As shown in Table 2 below, a bit for notifying UE radio capability-related information may be added to the UE network capability IE so as to notify that there is capability to transmit the UE radio capability-related information.

In other words, the UE 101 may transmit the UE radio capability-related information (for example, information for notifying that the UE is capable of providing UE radio capability ID-related information to a network or a UE radio capability ID support indication) by including the same to the TAU request transmitted by the UE 101 to the network.

Table 2 is an example of notifying that UE radio capability (for example, UE radio capability ID) may be provided in the UE network capability IE.

TABLE 2

| | | | UE Network Capability IE | | | | | |
|---|---|---|---|---|---|---|---|---|
| 8 | 7 | 6 | 5 | 4 | 3 | 2 | 1 | |
| | | | UE network capability IEI | | | | | octet 1 |
| | | | Length of UE network capability contents | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5* |
| UCS2 | UIA1 | UIA2 | UIA3 | UIA4 | UIA5 | UIA6 | UIA7 | octet 6* |
| ProSe-dd | ProSe | H.245-ASH | ACC-CSFB | LPP | LCS | 1 × SR VCC | NF | octet 7* |
| ePCO | HC-CP CIoT | ERw/oPDN | S1-U data | UP CIoT | CP CIoT | Prose-relay | ProSe-dc | octet 8* |
| 15 bearers | SGC | N1mode | DCNR | CP backoff | RestrictEC | V2X PC5 | multipleDRB | octet 9* |
| 0 | 0 | 0 | 0 | 0 | 0 | 0 | Radio info | octet |
| | | | Spare | | | | | 10*-15* |

Among parameter information of the UE network capability IE, the UE radio information indicates whether a function of providing UE radio information of Table 3, for example, information about the UE radio capability ID, is performed, and accordingly, a value of the UE radio information of Table 3 and interpretation of the value are as below.

TABLE 3

UE Radio Information IE
radio information

| Bit | |
|---|---|
| 0 | Radio info not support |
| 1 | Radio info suppot |

In operation 521, an MME may transmit a security mode command message to the UE 101.

In operation 523, the UE 101 may transmit the UE radio capability ID-related information while transmitting a security mode complete message to the MME.

TABLE 4

Security Mode Complete Message

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Security mode complete message identity | Message type 9.8 | M | V | 1 |
| 23 | IMEISV | Mobile identity 9.9.2.3 | O | TLV | 11 |
| 79 | Replayed NAS message container | Replayed INAS message container 9.9.3.51 | O | TLV-E | 3-n |
| | UE radio capability info | | | | |

UE radio capability information shown in FIG. 17 is the UE radio capability information transmitted from the UE 101 to the MME, and may be coded and interpreted as below as the UE radio capability ID-related information. FIG. 17 illustrates an example of UE radio capability information according to embodiments of the disclosure.

In operation 535, the UE 101 may transmit a TAU accept message to the MME while transmitting PLMN assigned UE radio information, UE radio information indication, cause information, and the like.

The MME may determine whether the MME has UE-related information and whether the information is valid, regarding information transmitted by the UE 101 to the MME.

When the information is not valid as a result of the determination or when the MME is capable of providing, to the UE, PLMN assigned UE radio-related information (for example, PLMN assigned UE radio ID-related information), the MME may generate new information. As another example, when the information is not valid as the result of the determination or when the MME is capable of generating the PLMN assigned UE radio-related information (for example, the PLMN assigned UE radio ID-related information) or providing, to the UE, the related information that has been stored, the MME may provide the PLMN assigned UE radio-related information (for example, the PLMN assigned UE radio ID-related information) by including the same to the TAU accept message transmitted by the MME to the UE. Information included in the TAU accept message is as Table 5 below.

TABLE 5

TAU Accept Message

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update accept message identity | Message type 9.8 | M | V | 1 |
| | EPS update result | EPS update resuit 9.9.3.13 | M | V | ½ |
| | Spare half octet | Spare half octet 9.9.2.9 | M | V | ½ |
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| | Radio info Radio info indi | Radio info Radio info indi | | | |

Also, information about radio information may be coded and interpreted shown in FIG. 18 and as Table6 below. For example, the radio information may include the PLMN assigned UE radio capability information (for example, the PLMN assigned UE radio capability ID information). FIG. 18 illustrates an example of a radio information IE according to embodiments of the disclosure.

Figure 19:
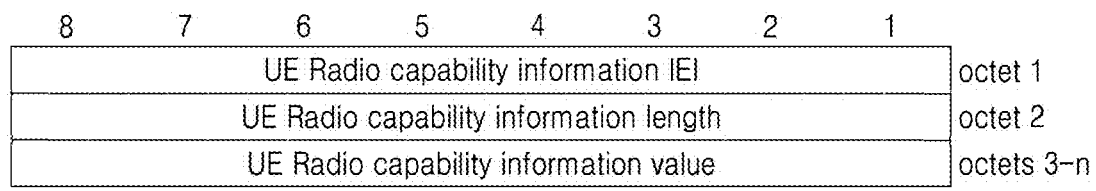
FIG. 19 illustrates another example of a radio information IE according to embodiments of the disclosure.

As another example, the radio information may include the UE radio capability information (for example, the UE radio capability ID information) as shown in FIG. 19 and Table 7. In other words, the UE radio capability information may be a value transmitted by the UE or a value assigned to the UE while the UE 101 moves from a source network to a target network (for example, a 4G network) via handover or mobility. FIG. 19 illustrates another example of a radio information IE according to embodiments of the disclosure.

A part of a radio information value of radio-related information included in FIG. 18 may be coded and interpreted as Table 6 below. In other words, a part of a value of the PLMN assigned UE radio capability of the PLMN assigned UE radio capability IE may be coded and interpreted as Table6 below.

TABLE 6

Part of Value of Radio Information, i.e., Part of Value
of PLMN Assigned UE Radio Capability IE PLMN assigned UE Radio capability information
value (octet 3 to octet n)
PLMN assigned UE Radio capability information.

The radio information value of the radio-related information included in FIG. 19 may be coded and interpreted as Table 7 below.

TABLE 7

Radio Information Value

UE Radio capability information value (octet 3 to octet n)
UE Radio capability information.

Radio information indication may be notified from the MME to the UE 101 via the TAU accept message. The radio information indication according to an embodiment may indicate whether the network is able to support the UE radio capability-related information (for example, the UE radio capability ID-related information) of the UE. Such radio access information indication is coded as Table 8 and interpreted as Table 9 below.

TABLE 8

Radio Information Indication IE

| 8 | 7 | 6 | 5 | 4 | 3 | 2 | 1 | |
|---|---|---|---|---|---|---|---|---|
| radio information indi IEI | | | | 0 | 0 | 0 | Radio info | octet 1 |
| | | | | spare | | | | |

TABLE 9

Value of Radio Information Indication
IE and Interpretation of Value
radio information indi (octet 1)

Bit

| 1 | | |
|---|---|---|
| 0 | | Radio info not support |
| 1 | | Radio info suppot |

Also, when an error is generated, the generation of error may be notified to the UE 101 through an error code of the TAU accept message. As shown in Table 10, the UE 101 may identify a cause of the error through the error code, i.e., an error cause, included in a message transmitted by the MME.

Also, the MME may delete previous radio access-related information regarding the UE and store updated information.

TABLE 10

EMM Error Cause

Cause value (octet 2)

Bits

| 8 | 7 | 6 | 5 | 4 | 3 | 2 | 1 | |
|---|---|---|---|---|---|---|---|---|
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 0 | 1 | 1 | 1 | Radio info mismatch |
| 0 | 1 | 1 | 0 | 1 | 1 | 1 | 1 | Protocol error, unspecified |

Figure 6:
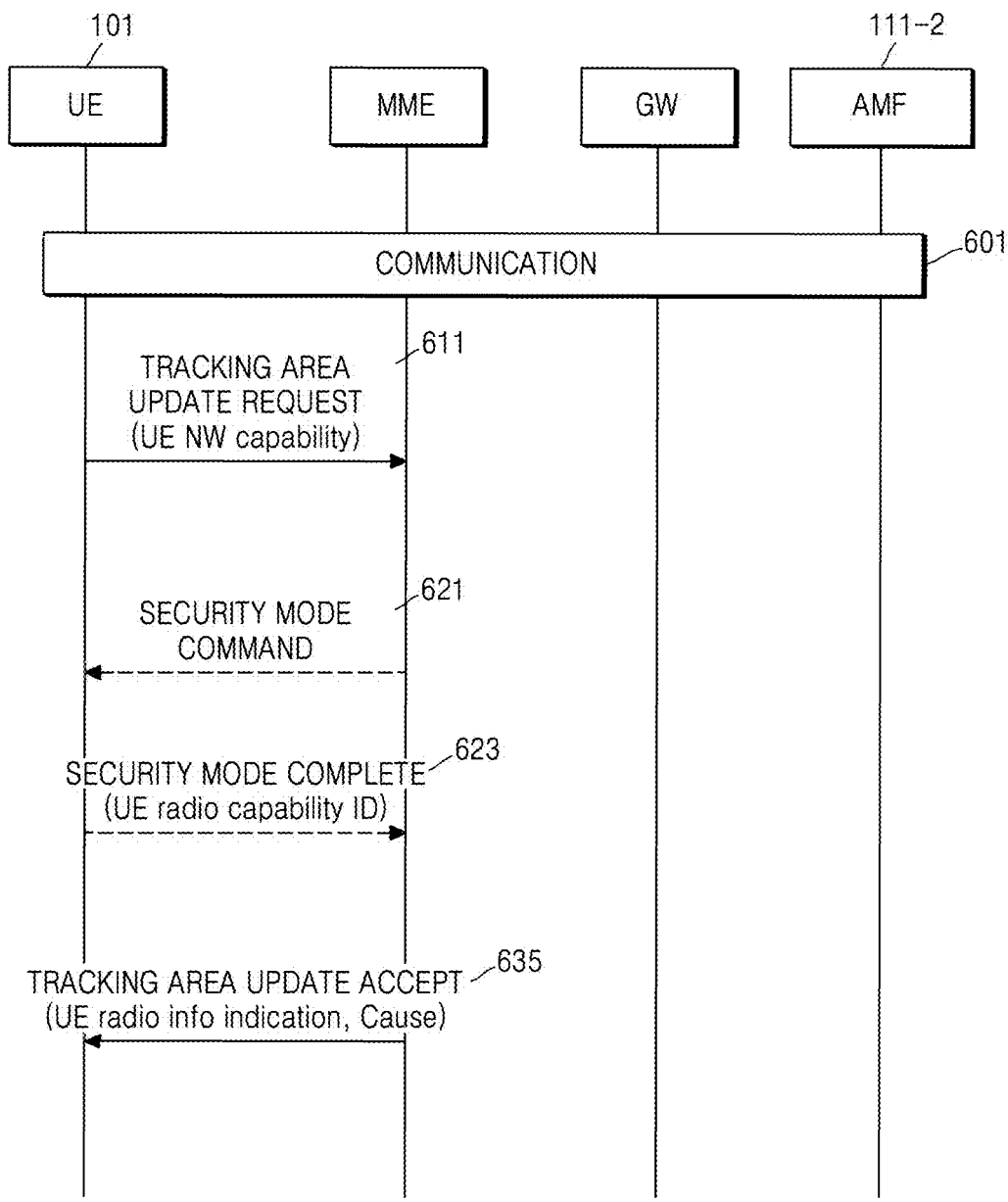
FIG. 6 is a diagram for describing an NAS message information processing and communicating method in a 5G network environment, according to an embodiment of the disclosure.

FIG. 6 is a diagram for describing an NAS message information processing and communicating method in a 5G network environment, according to an embodiment of the disclosure.

In operation 601, the UE 101 may perform communication with an AMF and the SMF in a 5G network.

In operation 611, the UE 101 may perform a TAU request by moving from the 5G network to a 4G network. Here, the UE may transmit a TAU request message to the MME while notifying the network of whether the UE supports UE radio information by setting of a bit value in a UE network capability IE.

The UE 101 may transmit radio access-related information by using the UE network capability IE included in the TAU request message, as in Table 11 below.

TABLE 11

TAU Request Message

| IEI | Information Element | Type/Rreference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update request message identity | Message type 9.8 | M | V | 1 |
| | EPS update type | EPS update type 9.9.3.14 | M | V | ½ |
| | NAS key set identifier | NAS key set identifier | M | V | ½ |

TABLE 11-continued

TAU Request Message

| IEI | Information Element | Type/Rreference | Presence | Format | Length |
|---|---|---|---|---|---|
| | Old GUTI | 9.9.3.21 EPS mobile identity 9.9.3.12 | M | LV | 12 |
| B- | Non-current native NAS key set identifier | NAS key set identifier 9.9.3.21 | O | TV | 1 |
| 8- | GPRS ciphering key sequence number | Ciphering key sequence number 9.9.3.4a | O | TV | 1 |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 55 | Nonce$_{UE}$ | Nonce 9.9.3.25 | O | TV | 5 |
| 58 | UE network capability | UE network capability 9.9.3.34 | O | TLV | 4-15 |
| 52 | Last visited registered TAI | Tracking area identity 9.9.3.32 | O | TV | 6 |
| 5C | DRX parameter | DRX parameter 9.9.3.8 | O | TV | 3 |

As in Table 12 below, a bit for notifying UE radio capability-related information may be added to the UE network capability IE so as to notify that there is capability to transmit the UE radio capability-related information through the UE network capability IE.

In other words, the UE may transmit the UE radio capability-related information (for example, information for notifying that the UE is capable of providing UE radio capability ID-related information to the network or a UE radio capability ID support indication) by including the same to the TAU request transmitted by the UE to the network.

Table 12 shows an example of the UE network capability IE providing UE radio capability (for example, UE radio capability ID).

TABLE 12

| UE Network Capability IEI | | | | | | | | |
|---|---|---|---|---|---|---|---|---|
| 8 | 7 | 6 | 5 | 4 | 3 | 2 | 1 | |
| UE network capability IEI | | | | | | | | octet 1 |
| Length of UE network capability contents | | | | | | | | octet 2 |
| EEA0 | 128-EEA1 | 128-EEA2 | 128-EEA3 | EEA4 | EEA5 | EEA6 | EEA7 | octet 3 |
| EIA0 | 128-EIA1 | 128-EIA2 | 128-EIA3 | EIA4 | EIA5 | EIA6 | EIA7 | octet 4 |
| UEA0 | UEA1 | UEA2 | UEA3 | UEA4 | UEA5 | UEA6 | UEA7 | octet 5 |
| UCS2 | UIA1 | UIA2 | UIA3 | UIA4 | UIA5 | UIA6 | UIA7 | octet 6 |
| ProSe-dd | ProSe | H.245-ASH | ACC-CSFB | LPP | LCS | 1 × SR VCC | NF | octet 7* |
| ePCO | HC-CP CIoT | ERw/oPDN | S1-U data | UP CIoT | CP CIoT | Prose-relay | ProSe-dc | octet 8* |
| 15 bearers | SGC | N1mode | DCNR | CP backoff | RestrictEC | V2X PC5 | multipleDRB | octet 9* |
| 0 | 0 | 0 | 0 | 0 | 0 | 0 | Radio info | octet 10*-15* |
| Spare | | | | | | | | |

The UE radio information in the UE network capability IE may be coded and interpreted as Table 13 below.

TABLE 13

UE Radio Information of UE Network Capability IE
(Value thereof and Interpretation of the Value)
radio information

| Bit | |
|---|---|
| 0 | Radio info not support |
| 1 | Radio info suppot |

In operation 621, the MME may transmit a security mode command message to the UE 101.

In operation 623, the UE 101 may transmit, to the MME, a security mode complete message including the UE radio capability ID-related information.

TABLE 14

Security Mode Complete Message

| IEI | Information Element | Type/Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |

TABLE 14-continued

Security Mode Complete Message

| IEI | Information Element | Type/ Reference | Presence | Format | Length |
|---|---|---|---|---|---|
| | Security mode complete message identity | Message type 9.8 | M | V | 1 |
| 23 | IMEISV | Mobile identity 9.9.2.3 | O | TLV | 11 |
| 79 | Replayed NAS message container | Replayed NAS message container 9.9.3.51 | O | TLV-E | 3-n |
| | UE radio capability info | | | | |

Meanwhile, information shown in FIG. 20 relates to information related to the UE radio capability information transmitted through the security mode complete message. This is the UE radio capability information transmitted from the UE 101 to the MME, and for example, may include UE radio capability ID-related information. FIG. 20 illustrates an example of UE radio capability information according to embodiments of the disclosure.

In operation 635, the MME may transmit a TAU accept message to the UE 101 while transmitting PLMN assigned UE radio information, UE radio information indication, cause information, and the like.

The MME determines whether the MME has UE-related information and whether the information is valid, regarding information transmitted by the UE 101 to the MME. When the information is not valid as a result of the determination or when the MME is capable of providing, to the UE, PLMN assigned UE radio-related information (for example, PLMN assigned UE radio ID-related information), the MME may generate new information. As another example, when the information is not valid as the result of the determination or when the MME is capable of providing, to the UE, the PLMN assigned UE radio-related information (for example, the PLMN assigned UE radio ID-related information), the MME may transmit the PLMN assigned UE radio-related information (for example, the PLMN assigned UE radio ID-related information) by including the same to the TAU accept message transmitted by the MME to the UE 101, as in Table 15 below.

TABLE 15

TAU Accept Message

| IEI | Information Element | Type/ Reference | Presence | Format | Length |
|---|---|---|---|---|---|
| | Protocol discriminator | Protocol discriminator 9.2 | M | V | ½ |
| | Security header type | Security header type 9.3.1 | M | V | ½ |
| | Tracking area update accept message identity | Message type 9.8 | M | V | 1 |
| | EPS update result | EPS update result 9.9.3.13 | M | V | ½ |
| | Spare half octet | Spare half octet 9.9.2.9 | M | V | ½ |

TABLE 15-continued

TAU Accept Message

| IEI | Information Element | Type/ Reference | Presence | Format | Length |
|---|---|---|---|---|---|
| 5A | T3412 value | GPRS timer 9.9.3.16 | O | TV | 2 |
| 50 | GUTI | EPS mobile identity 9.9.3.12 | O | TLV | 13 |
| 54 | TAI list | Tracking area identity list 9.9.3.33 | O | TLV | 8-98 |
| 57 | EPS bearer context status | EPS bearer context status 9.9.2.1 | O | TLV | 4 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| | UE radio info | UE Radio info | | | |
| | Radio info indi | Radio info indi | | | |

Figure 21:
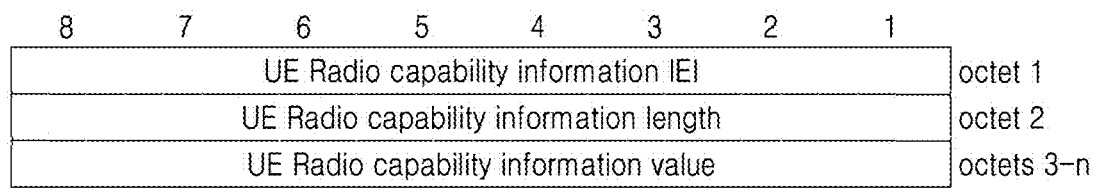
FIG. 21 illustrates another example of UE radio capability information according to embodiments of the disclosure.

Also, information about UE radio information may be coded and interpreted as shown in FIG. 21. An example of such radio information may include UE radio capability information (for example, UE radio capability ID information). FIG. 21 illustrates another example of UE radio capability information according to embodiments of the disclosure.

A UE radio capability information value of radio-related information may be coded and interpreted as below.

TABLE 16

UE Radio Capability Information Value

UE Radio capability information value (octet 3 to octet n)
UE Radio capability information.

The MME may notify the UE of radio information indication via the TAU accept message. Such radio information indication may indicate whether the network is able to support the UE radio capability-related information (for example, the UE radio capability ID-related information) of the UE.

Such radio access information indication may be coded as Table 17 and interpreted as Table18 below.

TABLE 17

Radio Information Indication IE

| 8 | 7 | 6 | 5 | 4 | 3 | 2 | 1 | |
|---|---|---|---|---|---|---|---|---|
| radio information indi IEI | | | | 0 | 0 | 0 | Radio info | octet 1 |
| | | | | | spare | | | |

TABLE 18

| Value of Radio Information Indication IE and Interpretation of Value |  |
| --- | --- |
| radio information indi (octet 1) | |
| Bit | |
| 1 | |
| 0 | Radio info not support |
| 1 | Radio info suppot |

Also, when an error is generated, the MME may notify the UE 101 of the generation of error through an error code of the TAU accept message. Also, the MME may delete previous radio access-related information regarding the UE and store updated information.

TABLE 19

| EMM Error Cause | | | | | | | | |
| --- | --- | --- | --- | --- | --- | --- | --- | --- |
| Cause value (octet 2) | | | | | | | | |
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HSS |
| 0 | 0 | 0 | 0 | 0 | 0 | 1 | 1 | Illegal UE |
| 0 | 0 | 0 | 0 | 0 | 1 | 0 | 1 | IMEI not accepted |
| 0 | 0 | 0 | 0 | 0 | 1 | 1 | 0 | Illegal ME |
| 0 | 0 | 0 | 0 | 0 | 1 | 1 | 1 | EPS services not allowed |
| 0 | 0 | 0 | 0 | 1 | 0 | 0 | 0 | EPS services and non-EPS services not allowed |
| 0 | 0 | 0 | 0 | 1 | 0 | 0 | 1 | UE identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Tracking Area not allowed |
| 0 | 0 | 0 | 0 | 1 | 1 | 0 | 1 | Roaming not allowed in this tracking area |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 0 | 1 | 1 | 1 | Radio info mismatch |
| 0 | 1 | 1 | 0 | 1 | 1 | 1 | 1 | Protocol error, unspecified |

Figure 7:
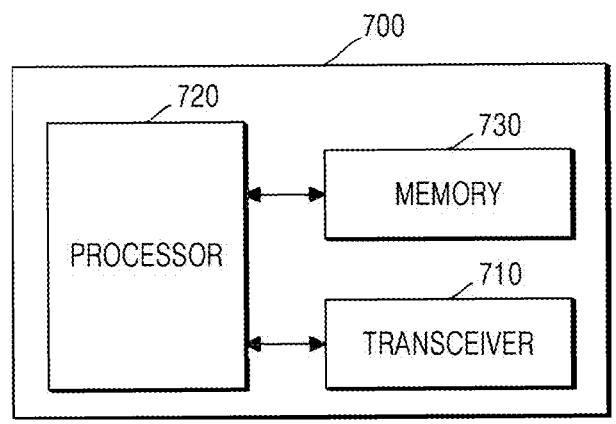
FIG. 7 is a block diagram of a structure of a UE, according to an embodiment.

FIG. 7 is a block diagram of a structure of a UE 700, according to an embodiment.

Referring to FIG. 7, the UE 700 may include a transceiver 710, a processor 720, and a memory 730. The transceiver 710, the processor 720, and the memory 730 may operate according to a communication method of a UE described above. However, the components of the UE 700 are not limited thereto. For example, the UE 700 may include fewer or more components (for example, a network interface controller (NIC)) than those described above. In addition, the transceiver 710, the processor 720, and the memory 730 may be implemented as a single chip.

The transceiver 710 may transmit or receive a signal to or from a network entity (for example, an MME). Here, the signal may include at least one message described above with reference to FIGS. 1 through 6. In this regard, the transceiver may include a radio frequency (RF) transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the processor 720, a signal through a wireless channel, and transmit a signal output from the processor 720 through the wireless channel.

The processor 720 is hardware for driving software for processing radio access information regarding the UE 700 while the UE 700 performs handover, and for example, one or more central processing units (CPUs) may be included in the processor 720. The processor 720 may drive software stored in the memory 730, and at this time, the software may include a radio access information management module and a handover module including one or more instructions. The handover module may process handover-related data generated while the UE moves to a different network. Also, the radio access information management module may process UE information, such as capability information of the UE, or network status information, such as an error cause or the like. The handover module and the radio access information management module may be manufactured as separate chips distinguished from the processor 720.

The memory 730 may store software and data required for operations of the UE 700. Also, the memory 730 may store control information or data included in a signal obtained by the UE. The memory may be a storage medium, such as read-only memory (ROM), random access memory (RAM), a hard disk, a CD-ROM, and a DVD, or a combination of storage media.

Figure 8:
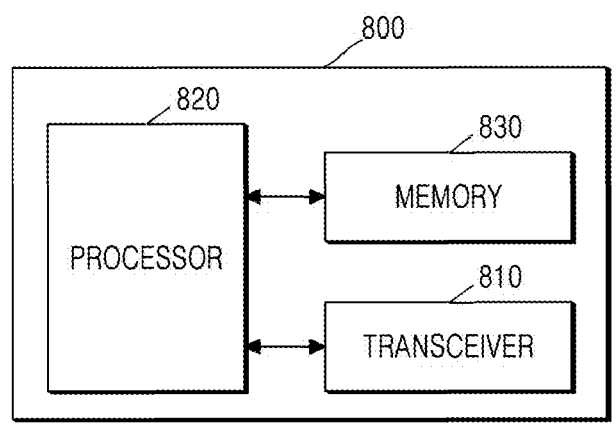
FIG. 8 is a block diagram of a structure of a network entity, according to an embodiment.

FIG. 8 is a block diagram of a structure of a network entity 800, according to an embodiment.

Referring to FIG. 8, the network entity 800 may include a transceiver 810, a processor 820, and a memory 830. The network entity 800 may be any one of the MME, the AMF, the eNB, and the 5G RAN described above with reference to FIGS. 1 through 6. The transceiver 810, the processor 820, and the memory 830 may operate according to a communication method of any one of the MME, the AMF, the eNB, and the 5G RAN described above. However, the components of the network entity 800 are not limited thereto. For example, the network entity 800 may include fewer or more components (for example, an NIC) than those described above. In addition, the transceiver 810, the processor 820, and the memory 830 may be implemented as a single chip.

The transceiver 810 may transmit or receive a signal to or from another network entity or a UE. Here, the signal may include at least one message described above with reference to FIGS. 1 through 6. In this regard, the transceiver may include an RF transmitter for up-converting and amplifying a frequency of a transmitted signal, and a RF receiver for amplifying low-noise and down-converting a frequency of a received signal. However, this is only an example of the transceiver and components of the transceiver are not limited to the RF transmitter and the RF receiver.

Also, the transceiver may receive and output, to the processor 820, a signal through a wireless channel, and transmit a signal output from the processor 820 through the wireless channel.

The processor 820 is hardware for driving software for processing radio access information regarding a UE while the UE performs handover, and for example, one or more CPUs may be included in the processor 820. The processor 820 may drive software stored in the memory 830, and at this time, the software may include a radio access information management module and a handover module including one or more instructions. The handover module may process handover-related data generated while the UE moves to a different network. Also, the radio access information management module may process network status information, such as an error cause or the like, or capability information of the UE. The handover module and the radio access information management module may be manufactured as separate chips distinguished from the processor 820.

The memory 830 may store software and data required for operations of the network entity 800. Also, the memory 830 may store control information or data included in a signal obtained from the UE. The memory 830 may be a storage medium, such as ROM, RAM, a hard disk, a CD-ROM, and a DVD, or a combination of storage media.

A UE may move from an LTE network, i.e., an MME, which does not support UE radio information, i.e., UE radio capability ID-related function, to an AMF of a network in which the UE supports UE radio information, i.e., UE radio capability ID, of 5G.

Figure 9:
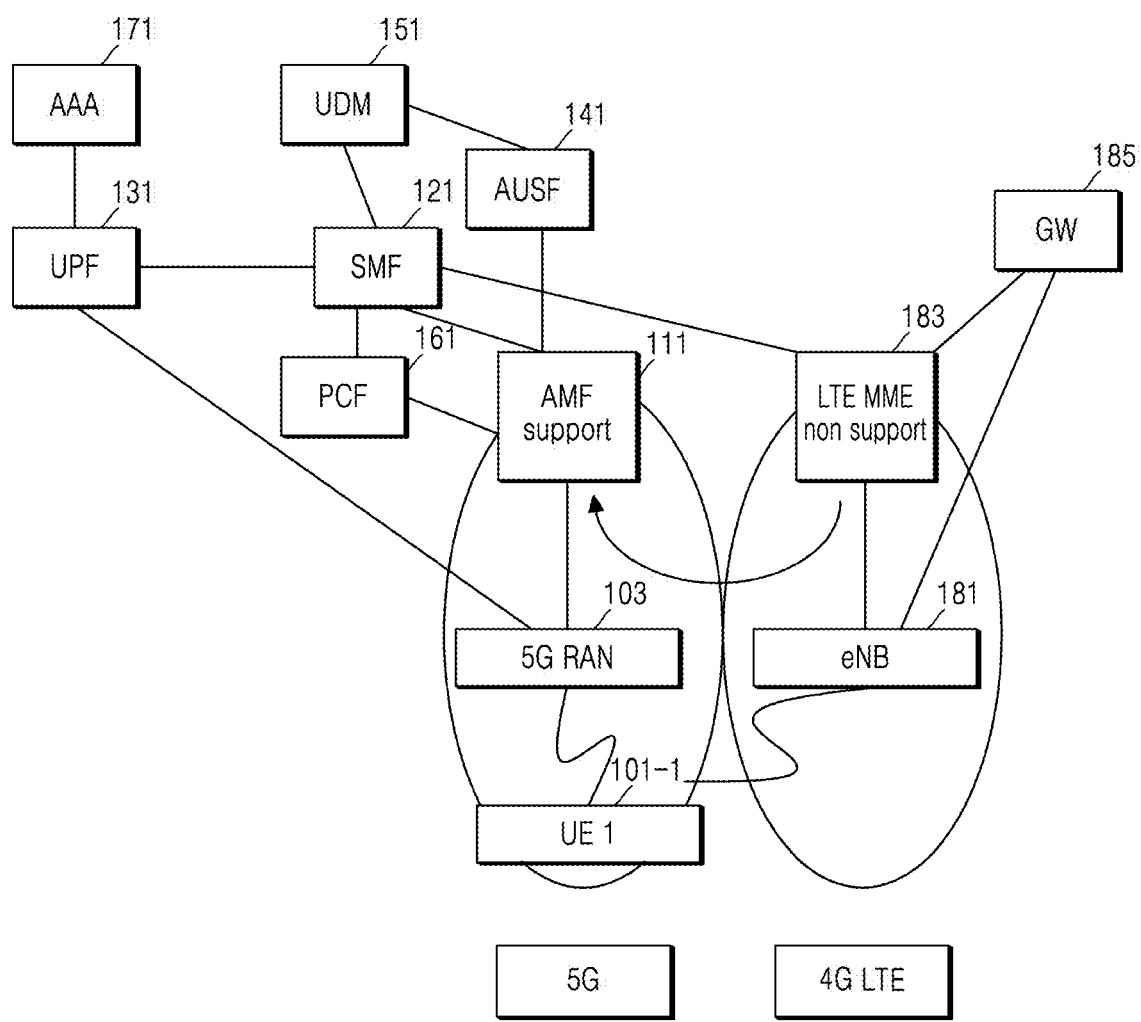
FIG. 9 is a diagram for describing an environment in which a 5G network and a 4G network coexist, according to an embodiment of the disclosure.
Figure 10:
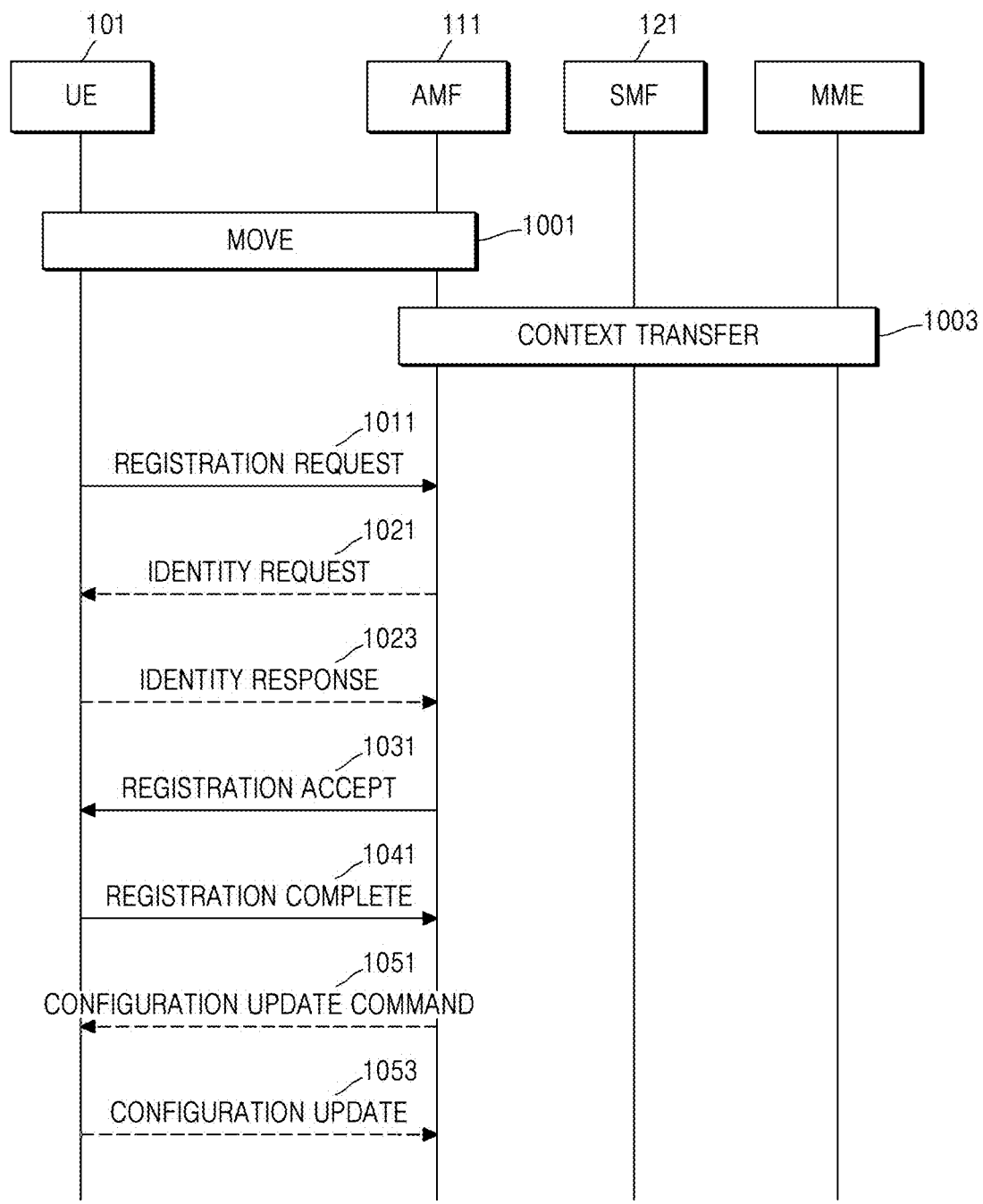
FIG. 10 is a diagram for describing an NAS message information processing and communicating method in a 5G network environment, according to an embodiment of the disclosure.

When a UE moves from a network that does not support UE radio information to a network that supports UE radio information, i.e., UE radio capability ID, as shown in FIG. 9, following operations of FIG. 10 may be possible.

In other words, despite that the UE supports a function of providing information about the UE radio capability ID, the LTE network to which the UE has previously accessed does not support such a function, and thus the UE needs to move to a 5G network providing the function and use the function by activating the function again.

In operation 1001, the UE has moved from an LTE MME network to a network including the AMF 111, in a handover or idle mode state.

In operation 1003, radio capability-related information of the UE is transmitted via context transfer from a source MME to the target AMF 111. Because the MME does not support the UE radio capability ID, the radio capability-related information of the UE is transmitted from the MME to the AMF 111 in full information. In other words, such information is radio access-related parameters. The information may be transmitted from the source MME to the target AMF upon a request from the target AMF to the source MME. Also, according to an embodiment, the source MME may perform the context transfer to the target AMF.

As such, the target AMF 111 has received, from the source MME, full radio capability regarding the UE.

In operation 1011, the UE transmits a registration request to the target AMF 111. Here, despite that the UE is able to provide the UE radio information, for example, the UE radio capability ID, the UE does not provide such information. This is because, despite that the UE has moved from the network including the MME incapable of providing the UE radio capability ID to the AMF 111 capable of providing the UE radio capability ID, the UE does not have information thereof.

Alternatively, it is unable to verify whether a radio access capability ID provided by the UE and a radio access capability ID included in the network match each other.

In operation 2021, the AMF transmits, to the UE, an ID request message with a PEI as an ID.

In operation 1023, the UE transmits an ID response message to the AMF while notifying the AMF of tracking area code (TAC) information required for a radio access capability operation. Alternatively, the UE may transmit the ID response message to the AMF while transmitting UE radio information or UE radio capability ID.

In operation 1031, the AMF 111 transmits a registration access message to the UE 101.

In operation 1041, the UE transmits a registration complete message to the AMF.

In operation 1051, the AMF transmits a configuration update command message to the UE. Here, the AMF may assign a PLMN assigned UE radio capability ID to the UE.

In operation 1053, the UE transmits a configuration update complete message to the AMF.

An embodiment is possible via various methods.

Embodiment 1) A method of providing the UE radio capability ID together when the UE transmits the registration request of operation 1003 to the target AMF 111.

Procedures for such a method are as follows.

Method 1-1) When the UE transmits the registration request to the AMF, a manufacturer ID assigned by a manufacturer of the UE when the UE radio capability ID included in the UE is provided is provided as a UE radio capability ID. Method 1-2) Another method is about providing the PLMN assigned UE radio capability ID to the AMF, in a case where there is the PLMN assigned UE radio capability ID assigned from the network when the UE is to provide the UE radio capability ID in the UE and the UE is to transmit the registration request to the AMF, as the UE has accessed the network and the PLMN.

Embodiment 2) A method of providing, by the UE, the UE radio capability ID to the AMF as the AMF requests the UE to provide the UE radio capability ID.

Procedures for such a method are as follows.

The procedures are related to a case where there is no full UE radio capability received by the AMF via the context transfer in operation 1003 or no UE radio capability ID provided by the UE to the AMF in operation 1011, or where the UE radio capability-related information does not match according to verification by the AMF.

Method 2-1) The AMF requests the UE to provide the UE radio information or UE radio capability ID, and receives a response thereto.

In this regard, the AMF may perform operation 1031 by transmitting the registration access message while transmitting indication of requesting the UE radio information, i.e., the UE radio capability ID.

Alternatively, the AMF may perform operation 1031 by transmitting the registration access message while notifying that the UE radio information, i.e., the UE radio capability ID, does not match, and for example, notify an error cause that the UE radio capability ID does not match.

Also, the AMF may configure and transmit PLMN assigned UE radio information, i.e., the PLMN assigned UE radio capability ID.

Method 2-2) The AMF requests the UE to provide the UE radio information or UE radio capability ID, and receives the response thereto.

The AMF may perform operation 1031 by transmitting the registration access message while transmitting indication of requesting the UE radio information, i.e., the UE radio capability ID.

Alternatively, the AMF may perform operation 1031 by transmitting the registration access message while notifying, via indication, that the UE radio information, i.e., the UE radio capability ID, does not match or that the UE radio information, i.e., the UE radio capability ID, is required.

Then, upon receiving the response, the AMF may configure and transmit the PLMN assigned UE radio information, i.e., the PLMN assigned UE radio capability ID.

Method 2-3) The AMF requests the UE to provide the UE radio information or UE radio capability ID, and receives the response thereto.

In this regard, the AMF needs to perform following operations before transmitting the registration access message in operation 1031.

In operation 2021, the AMF transmits, to the UE, the ID request message with the PEI as the ID.

In operation 1023, the UE transmits the ID response message to the AMF while notifying the AMF of TAC information required for the radio access capability operation. Alternatively, the UE may transmit the ID response message to the AMF while transmitting the UE radio information or UE radio capability ID.

Embodiment 3) A method of providing, by the AM, the radio capability ID to the UE.

Procedures for such a method are as follows.

The UE transmits the registration request to the AMF in operation 1011. Here, the UE may also transmit the UE radio capability ID. The UE radio capability ID may be the PLMN assigned radio capability ID received by the UE from the network, or a manufacturer UE radio capability ID assigned by the manufacturer. Alternatively, because the UE has moved from the MME that does not support the corresponding function, the UE may not provide the UE radio capability ID to the AMF 111 despite that the UE has a function of providing the radio information, such as the UE radio capability ID.

Method 3-1) There is the UE radio capability ID received from the UE and the UE radio capability ID is the same as full UE radio capability information.
Method 3-1-1)

In operation 1031, in a case where the AMF 111 has received the full UE radio capability information regarding the UE from the MME in operation 1003, i.e., via the context transfer, when there is the UE radio capability ID received from the UE through the registration request in operation 1011,
  the AMF 111 may compare information regarding the UE radio capability ID, i.e., the UE radio capability-related information regarding the UE, with the full radio capability information received from the MME via the context transfer, and when they are the same, store the UE radio capability ID received from the UE, and use the UE radio capability ID afterwards.

Alternatively, according to an embodiment,
Method 3-1-2)

In operation 1031, in a case where the AMF 111 has received the full UE radio capability information regarding the UE from the MME in operation 1003, i.e., via the context transfer, when there is the UE radio capability ID received from the UE through the registration request in operation 1011,
  the AMF 111 may compare information regarding the UE radio capability ID, i.e., the UE radio capability-related information regarding the UE, with the full radio capability information received from the MME via the context transfer, and when they are the same, store the UE radio capability ID received from the UE, use the UE radio capability ID afterwards, and transmit the PLMN assigned UE radio capability ID assigned by the AMF to the UE.

Method 3-2) There is no UE radio capability ID but is the same as the full radio capability information based on comparison.

In operation 1031, when the AMF 111 has received the full UE radio capability information regarding the UE from the MME in operation 1003, i.e., via the context transfer, the UE has accessed the AMF 111 before and thus the AMF 111 has information regarding the UE (for example, an ID of 5G-GUTI regarding the UE) or information regarding the UE radio capability ID,
  there is no UE radio capability ID received from the UE via the registration request in operation 1011, and
  the full radio capability information received from the MME via the context transfer and the radio capability-related information of the UE are the same information based on comparison,
Method 3-2-1) the AMF notifies the UE of the UE radio capability ID stored in the AMF in operation 1031.

Alternatively,

Method 3-2-2) In operation 1031, the AMF may synchronize pieces of information the UE and the network have by assigning the PLMN assigned UE radio capability ID newly assigned by the AMF to the UE and transmitting the same.

Method 3-3) There is no UE radio capability ID or even when there is the UE radio capability ID, the UE radio capability ID is different from the full radio capability information based on comparison.

Method 3-3-1) when the full radio capability information received from the MME via the context transfer and the radio capability-related information of the UE are different information based on comparison,
  the AMF generates the PLMN assigned UE radio capability ID and notifies the same to the UE, in operation 1031. According to an embodiment, upon receiving the registration complete message from the UE as a response, the AMF stores the PLMN assigned UE radio information, i.e., the PLMN assigned UE radio capability ID information.

Method 3-3-2) In operation 1031, when the UE has accessed the AMF and thus the AMF has the information regarding the UE, but the there is no UE radio information received from the UE, which corresponds to the full UE radio capability received from the source MME by the AMF, for example, there is no UE radio capability ID information or UE radio information corresponding to the full UE radio capability received from the source MME by the AMF,
  the AMF may transmit the PLMN assigned UE radio capability ID corresponding to the UE, in operation 1031. Method 4) A configuration update command is used.

While transmitting the configuration update command from the AMF to the UE, the PLMN assigned UE radio capability ID and PLMN assigned UE radio capability ID deletion indication are configured and transmitted.

Upon receiving the same, the UE deletes the UE radio capability ID for a corresponding PLMN, i.e., the previously assigned PLMN assigned UE radio capability ID, and transmits the configuration update complete message to the AMF.

In other words, operations are performed as follows.

In operation 1031,
- when the AMF 111 has received the full UE radio capability information regarding the UE from the MME in operation 1003, i.e., via the context transfer, the UE has accessed the AMF 111 before and thus the AMF 111 has the information regarding the UE (for example, the ID of 5G-GUTI regarding the UE) or information regarding the UE radio capability ID,
- there is no UE radio capability ID received from the UE via the registration request in operation 1011, and
- the full radio capability information received from the MME via the context transfer and the radio capability-related information of the UE are the same information based on comparison,
- the AMF 111 transmits the registration access message to the UE 101-1 as in operation 1031.

As in operation 1041, the UE transmits the registration complete message to the AMF.

As in operation 1051, the AMF transmits the configuration update command message to the UE. Here, the AMF may assign the PLMN assigned UE radio capability ID to the UE.

As in operation 1053, the UE transmits the configuration update complete message to the AMF.

According to an embodiment, provided is a method by which a UE performs communication in a wireless communication system, including: transmitting, by the UE, a TAU request message including UE capability information to a target network entity that is a handover target; receiving, from the target network entity, a request message regarding a UE capability ID; transmitting information about the UE capability ID to the target network entity; and receiving a TAU complete message from the target network entity as radio access information regarding the UE is updated in the target network entity, based on the UE capability ID.

Figure 11:
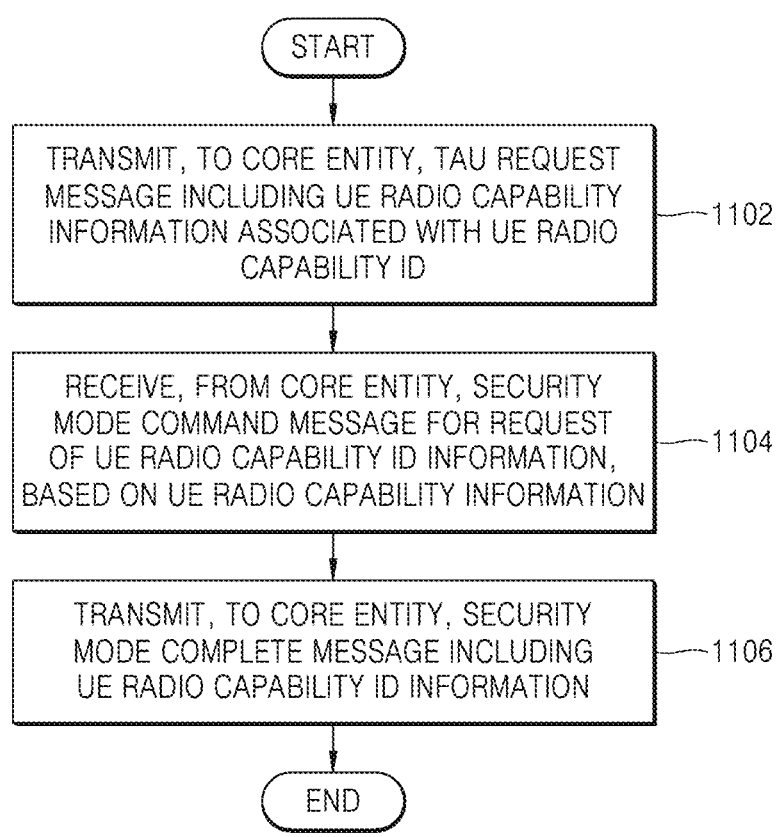
FIG. 11 is a flowchart for describing an operation method of a UE, according to an embodiment of the disclosure.

FIG. 11 is a flowchart for describing an operation method of a UE, according to an embodiment of the disclosure.

In operation 1102, the UE may transmit, to a core entity, a TAU request message including UE radio capability information associated with a UE radio capability ID. The core entity may include an MME, and the MME may include an entity that is a handover target. For example, when the UE is handed over from a 5G network to a 4G network, the UE may transmit, to the MME, the TAU request message including the UE radio capability information.

In detail, the UE radio capability information may include bit information indicating that the UE is capable of providing the UE radio capability ID. For example, when the bit information has a value of 1, the UE radio capability information may indicate that the UE is capable of providing the radio capability ID. When the bit information has a value of 0, the UE radio capability information may indicate that the UE is incapable of providing the radio capability ID. While being handed over to the 4G network, the UE may transmit the TAU request message including information indicating that the UE is capable of providing the radio capability ID to the MME.

In operation 1104, the UE may receive, from the core entity, a security mode command message for requesting UE radio capability ID information, based on the UE radio capability information. The core entity may request the UE for the UE radio capability ID information, based on the UE radio capability information included in the TAU request message. In detail, the core entity may request the UE for the UE radio capability ID information when the UE radio capability information indicates that the UE is capable of providing the radio capability ID information, based on the bit information included in the UE radio capability information.

Also, the UE may receive, from the core entity, a security mode message based on information for a UE radio capability ID available in the core entity. In detail, the core entity may request the UE for the UE radio capability ID information when the information regarding the radio capability ID available in the core entity indicates that there is no radio capability ID available in the core entity.

According to an embodiment, the UE may receive the security mode message from the core entity when the UE is capable of providing the radio capability ID information and there is no radio capability ID available in the core entity.

In operation 1106, the UE may transmit, to the core entity, a security mode complete message including the UE radio capability ID information, in response to the security mode command message. Then, the UE may receive a TAU complete message from the core entity.

Figure 12:
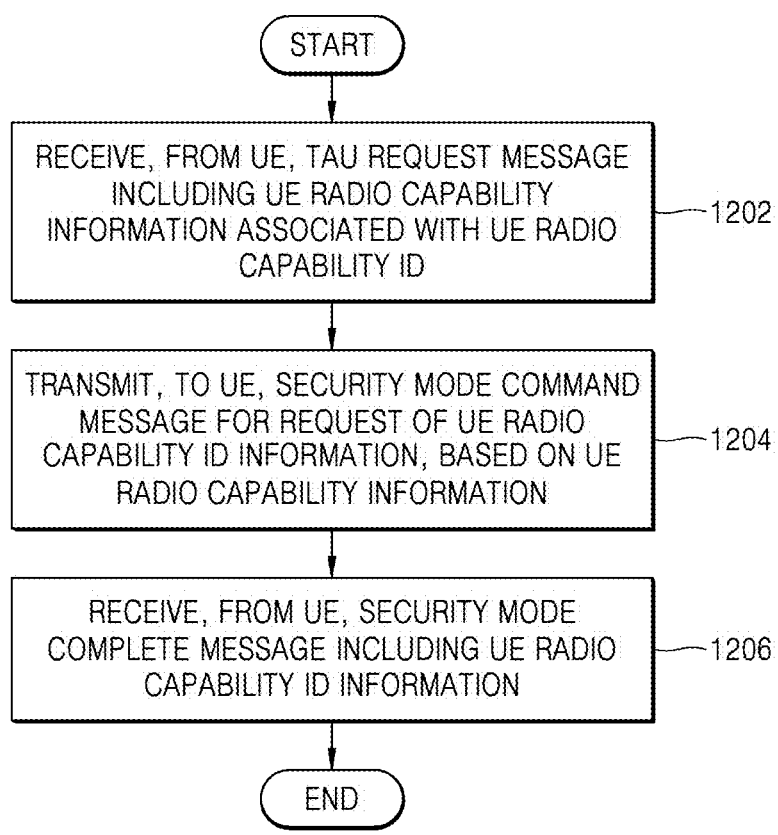
FIG. 12 is a diagram for describing an operation method of a core entity, according to an embodiment of the disclosure.

FIG. 12 is a diagram for describing an operation method of a core entity, according to an embodiment of the disclosure.

In operation 1202, the core entity may receive, from a UE, a TAU request message including UE radio capability information associated with a UE radio capability ID. The core entity may include an MME, and the MME may include an entity that is a handover target. For example, when the UE is handed over from a 5G network to a 4G network, the MME may receive, from the UE, the TAU request message including the UE radio capability information.

In detail, the UE radio capability information may include bit information indicating that the UE is capable of providing the UE radio capability ID. For example, when the bit information has a value of 1, the UE radio capability information may indicate that the UE is capable of providing the radio capability ID. When the bit information has a value of 0, the UE radio capability information may indicate that the UE is incapable of providing the radio capability ID. While the UE is handed over to the 4G network, the MME may receive, from the UE, the TAU request message including information indicating that the UE is capable of providing the radio capability ID to the MME.

In operation 1204, the core entity may transmit, to the UE, a security mode command message for requesting UE radio capability ID information, based on the UE radio capability information. The core entity may request the UE for the UE radio capability ID information, based on the UE radio capability information included in the TAU request message. In detail, the core entity may request the UE for the UE radio capability ID information when the UE radio capability information indicates that the UE is capable of providing the radio capability ID information, based on the bit information included in the UE radio capability information.

Also, the core entity may transmit, to the UE, a security mode message based on information for a UE radio capability ID available in the core entity. In detail, the core entity may request the UE for the UE radio capability ID information when the information regarding the radio capability ID available in the core entity indicates that there is no radio capability ID available in the core entity.

According to an embodiment, the core entity may transmit the security mode message to the UE when the UE is capable of providing the radio capability ID information and there is no radio capability ID available in the core entity.

In operation 1206, the core entity may receive, from the UE, a security mode complete message including the UE radio capability ID information. Then, the core entity may transmit a TAU complete message to the UE.

According to an embodiment of the disclosure, a UE in a wireless communication system includes: a transceiver; and at least one processor configured to: transmit, to a core entity via the transceiver, a TAU request message including UE radio capability information associated with a UE radio capability ID; receive, from the core entity via the transceiver, a security mode command message based on the UE radio capability information; and transmit, to the core entity via the transceiver, a security mode complete message including the UE radio capability ID information.

According to an embodiment, the at least one processor may be further configured to receive, from the core entity via the transceiver, the security mode command message, based on information for a UE radio capability ID available in the core entity.

According to an embodiment, the UE radio capability information may include bit information indicating that the UE supports the UE radio capability ID.

According to an embodiment, the information for the UE radio capability ID available in the core entity may indicate that the UE radio capability ID available in the core entity does not exist.

According to an embodiment, the core entity may include an MME, wherein the MME may include an entity that is a handover target.

According to an embodiment of the disclosure, a core entity in a wireless communication system includes: a transceiver; and at least one processor configured to: receive, from a UE through the transceiver, a TAU request message including UE radio capability information associated with a UE radio capability ID; transmit, to the UE through the transceiver, a security mode command message based on the UE radio capability information; and receive, from the UE through the transceiver, a security mode complete message including the UE radio capability ID information. According to specific embodiments of the disclosure, components included in the disclosure are described in the singular or plural forms according to proposed specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

The invention claimed is:

1. A method performed by a core entity in a wireless communication system, the method comprising:
   receiving, from a user equipment (UE), a tracking area update (TAU) request message including a bit value indicating whether the UE supports a signaling of UE radio capability information based on a UE radio capability identity (ID);
   identifying whether the core entity has information associated with the UE radio capability ID;
   in case that the bit value indicates that the UE supports the signaling of the UE radio capability information based on the UE radio capability ID, and that no UE radio capability ID is available in the core entity, transmitting, to the UE, a security mode command message for requesting the UE radio capability ID; and
   receiving, from the UE, a security mode complete message including the UE radio capability ID.

2. The method of claim 1, further comprising:
   transmitting, to the UE, a TAU accept message including network-assigned UE radio capability ID information.

3. The method of claim 1, wherein in case that the bit value is equal to 1, the bit value indicates that the UE supports the signaling of the UE radio capability information based on the UE radio capability ID.

4. The method of claim 1, wherein the core entity comprises a mobility management entity (MME), and
   wherein the MME comprises an entity that is a handover target.

5. A core entity in a wireless communication system, the core entity comprising:
   a transceiver; and
   at least one processor coupled with the transceiver and configured to:
      receive, from a user equipment (UE), a tracking area update (TAU) request message including a bit value indicating whether the UE supports a signaling of UE radio capability information based on a UE radio capability identity (ID);
      identify whether the core entity has information associated with the UE radio capability ID;
      in case that the bit value indicates that the UE supports the signaling of the UE radio capability information based on the UE radio capability ID, and that no UE radio capability ID is available in the core entity, transmit, to the UE, a security mode command message for requesting the UE radio capability ID; and
      receive, from the UE, a security mode complete message including the UE radio capability ID.

6. A method performed by a user equipment (UE) in a wireless communication system, the method comprising:
   transmitting, to a core entity, a tracking area update (TAU) request message including a bit value indicating whether the UE supports a signaling of UE radio capability information based on a UE radio capability identity (ID);
   in case that the bit value indicates that the UE supports the signaling of the UE radio capability information based on the UE radio capability ID, and that no UE radio capability ID is available in the core entity, receiving, from the core entity, a security mode command message for requesting the UE radio capability ID; and
   transmitting, to the core entity, a security mode complete message including the UE radio capability ID.

7. A user equipment (UE) in a wireless communication system, the UE comprising:
   a transceiver; and
   at least one processor coupled with the transceiver and configured to:
      transmit, to a core entity, a tracking area update (TAU) request message including a bit value indicating whether the UE supports a signaling of UE radio capability information based on a UE radio capability identity (ID);
      in case that the bit value indicates that the UE supports the signaling of the UE radio capability information based on the UE radio capability ID, and that no UE radio capability ID is available in the core entity, receive, from the core entity, a security mode command message for requesting the UE radio capability ID; and transmit, to the core entity, a security mode complete message including the UE radio capability ID.

\* \* \* \* \*